(12) United States Patent
Tsurumi et al.

(10) Patent No.: US 10,844,907 B2
(45) Date of Patent: Nov. 24, 2020

(54) CAGE FOR THRUST ROLLER BEARING AND THRUST ROLLER BEARING

(71) Applicants: JTEKT CORPORATION, Osaka-shi, Osaka (JP); UTSUNOMIYA KIKI CO., LTD., Utsunomiya-shi, Tochigi (JP)

(72) Inventors: Koichiro Tsurumi, Utsunomiya (JP); Yoshitomo Kabayama, Utsunomiya (JP)

(73) Assignees: JTEKT CORPORATION, Osaka (JP); UTSUNOMIYA KIKI CO., LTD., Utsunomiya (JP)

( * ) Notice: Subject to any disclaimer, the term of this patent is extended or adjusted under 35 U.S.C. 154(b) by 0 days.

(21) Appl. No.: 16/487,972

(22) PCT Filed: Feb. 22, 2018

(86) PCT No.: PCT/JP2018/006563
§ 371 (c)(1),
(2) Date: Aug. 22, 2019

(87) PCT Pub. No.: WO2018/155586
PCT Pub. Date: Aug. 30, 2018

(65) Prior Publication Data
US 2020/0056660 A1    Feb. 20, 2020

(30) Foreign Application Priority Data

Feb. 22, 2017 (JP) .................................. 2017-031169
Feb. 1, 2018 (JP) .................................. 2018-016638

(51) Int. Cl.
*F16C 33/54* (2006.01)
*F16C 19/30* (2006.01)

(52) U.S. Cl.
CPC .......... *F16C 33/547* (2013.01); *F16C 19/305* (2013.01)

(58) Field of Classification Search
CPC ............... F16C 19/305; F16C 33/4641; F16C 33/4647; F16C 33/467; F16C 33/54;
(Continued)

(56) References Cited

U.S. PATENT DOCUMENTS 1,380,622 A    6/1921  Winn
3,644,007 A *  2/1972  Alling .................. F16C 19/305
                                             384/623
(Continued)

FOREIGN PATENT DOCUMENTS

JP    S63-106917 U    7/1988
JP    S63-178627 U    11/1988
(Continued)

OTHER PUBLICATIONS

May 15, 2018 International Search Report issued in International Patent Application No. PCT/JP2018/006563.
(Continued)

*Primary Examiner* — James Pilkington
(74) *Attorney, Agent, or Firm* — Oliff PLC

(57) ABSTRACT

A cage for a thrust roller bearing is provided. The cage has first and second cage members each having an outer ring portion formed radially outside of a roller retention hole. The outer ring portion has a flange portion that extends, from a radially outer end of the outer ring portion, in an axial direction and is divided along the circumferential direction. The flange portion has a large diameter portion and a small diameter portion. The first cage member and the second cage member are fastened to each other while the large diameter portion and small diameter portion of the first cage member (Continued)

overlap the small diameter portion and large diameter portion of the second cage member, respectively.

19 Claims, 15 Drawing Sheets

(58) Field of Classification Search
CPC .... F16C 33/541; F16C 33/542; F16C 33/547; F16C 2220/84; F16C 2226/52
See application file for complete search history.

(56) References Cited

U.S. PATENT DOCUMENTS

| | | | | |
|---|---|---|---|---|
| 3,972,575 | A * | 8/1976 | Chiba | F16C 19/305 384/623 |
| 6,619,850 | B1 * | 9/2003 | Kenney, Jr. | F16C 19/30 384/470 |
| 7,273,318 | B2 * | 9/2007 | Hayashi | F16C 19/305 384/623 |
| 7,398,724 | B2 * | 7/2008 | Obayashi | F16C 33/541 92/71 |

FOREIGN PATENT DOCUMENTS

| | | |
|---|---|---|
| JP | H05-180218 A | 7/1993 |
| JP | 2007-064428 A | 3/2007 |

OTHER PUBLICATIONS

May 15, 2018 Written Opinion of the International Searching Authority issued in International Patent Application No. PCT/JP2018/006563.

* cited by examiner

FIG. 11A
FIG. 11B
FIG. 11C
FIG. 11D
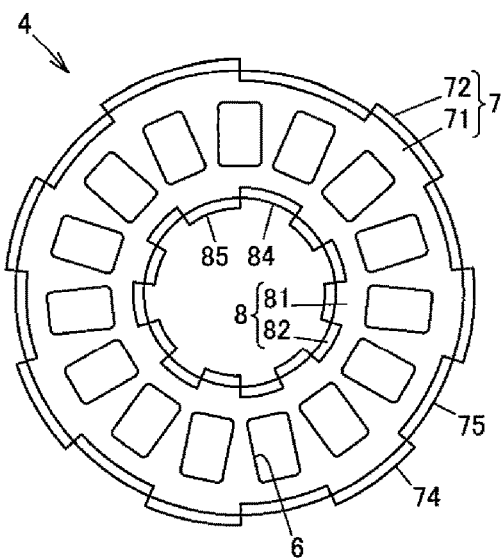
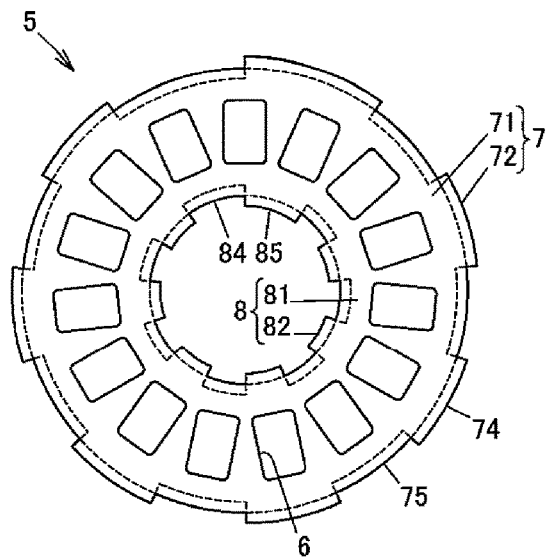
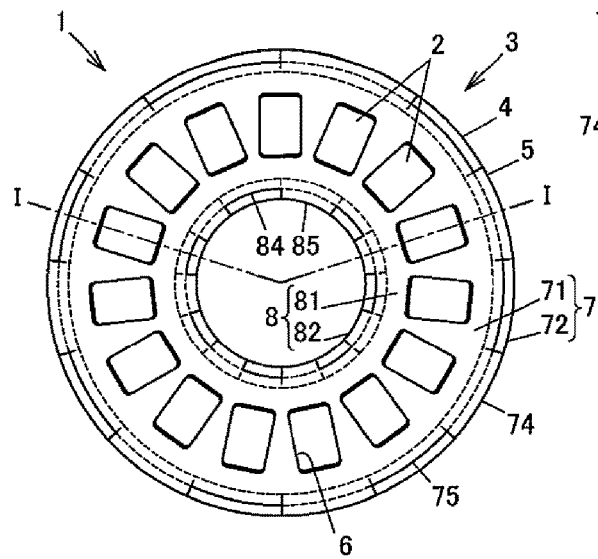
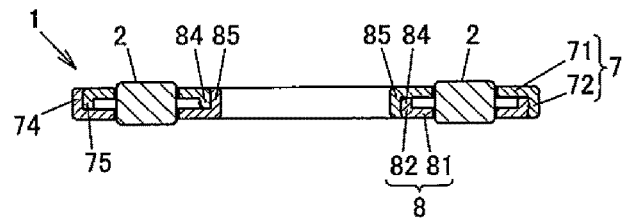

FIG. 15A
FIG. 15B
FIG. 15C
FIG. 15D
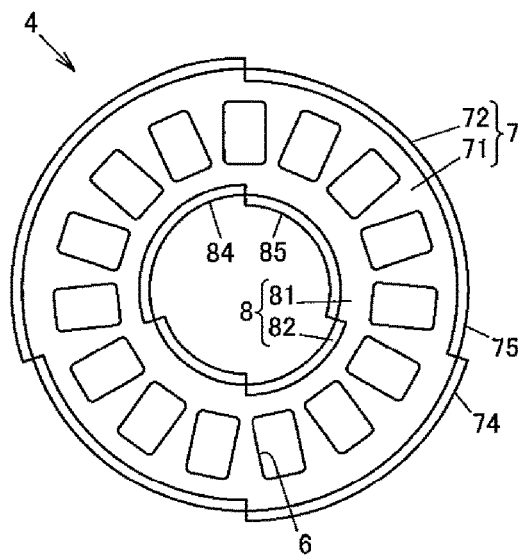
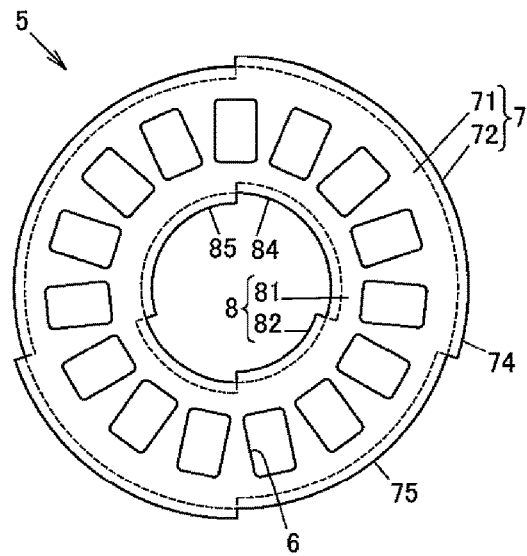
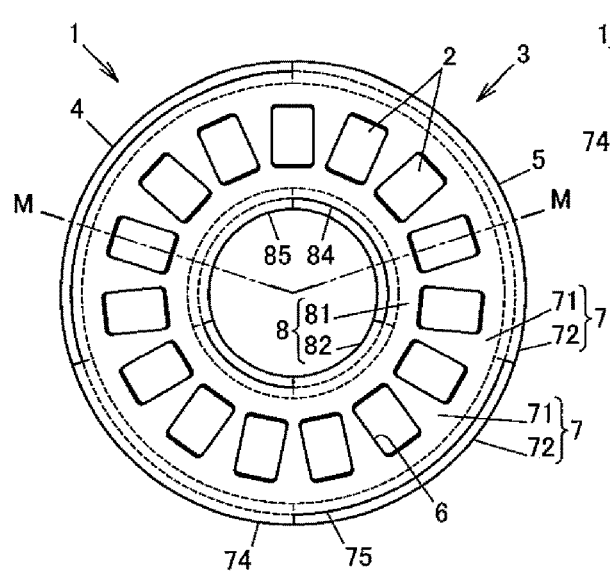
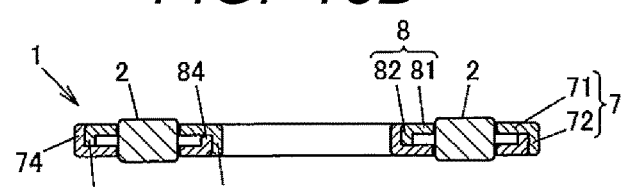

CAGE FOR THRUST ROLLER BEARING AND THRUST ROLLER BEARING

This application is based on Japanese Patent Application No. 2017-031169 filed on Feb. 22, 2017 and Japanese Patent Application No. 2018-016638 filed on Feb. 1, 2018, the contents of which are incorporated herein by reference.

TECHNICAL FIELD

An aspect of the present invention relates to a cage for a thrust roller bearing and a thrust roller bearing.

BACKGROUND ART

There is a thrust roller bearing in the conventional art in which a plurality of rollers are rollably interposed between two races that face each other. The thrust roller bearing is used to, for example, facilitate rotation of a rotary member while receiving a thrust force in the rotation axis direction by being interposed between the rotary member and a non-rotary member in a transmission of a vehicle.

The plurality of rollers in the thrust roller bearing are rollably held by a cage disposed between the two races. As a cage used in the thrust roller bearing, a combination of two plate members (hereinafter, referred to as double-plate cage) is known (see, e.g., Patent Documents 1 and 2).

As illustrated in Patent Documents 1 and 2, a double-plate cage is configured with, in combination, an outer cage that is one plate member and an inner cage that is the other plate member. The outer cage and the inner cage are joined together by swaging an outer periphery of the outer cage with the inner cage being received in the outer cage.

The outer cage and the inner cage are each formed with a plurality of retaining holes to retain a plurality of rollers. Each of the retaining holes includes a part having a smaller width than the diameter of the rollers. The rollers are prevented from coming out of the double-plate cage by being locked at peripheral edges of the retaining holes of the outer cage and the inner cage.

PRIOR ART DOCUMENTS

Patent Documents

Patent Document 1: JP2007-064428A
Patent Document 2: JPHS-180218A

SUMMARY OF INVENTION

Problem to be Solved by Invention

However, shapes of the outer cage and the inner cage are required to be different in the double-plate cage in the conventional art. Accordingly, respective pressing steps are necessary during manufacture, leaving room for improvement from a viewpoint of simplifying the manufacturing process and reducing cost.

An aspect of the invention provides a cage for a thrust roller bearing and a thrust roller bearing to improve manufacturing process and reduce cost.

Solution to Problem

To achieve the object, a first aspect of the present invention provides cage for a thrust roller bearing, the cage having an annular shape and retains a plurality of rollers in a rollable manner. The cage has a first cage member and a second cage member, each of the first cage member and the second cage member including an outer annular portion formed on a radially outer side of a plurality of retaining holes that retains the plurality of rollers; an inner annular portion formed on a radially inner side of the retaining holes; and a plurality of cage bar portions radially connecting the outer annular portion and the inner annular portion to each other to restrict an axial movement of the rollers. The first cage member and the second cage member are configured to have a same shape. Each of the outer annular portion of the first cage member and the outer annular portion of the second cage member includes a vertical portion having a planar and annular shape and extending perpendicular to an axial direction that is parallel to a central axis; and a flange portion extending axially from a radially outer end of the vertical portion and is circumferentially divided into a plurality of arc-shaped parts. The flange portion includes arc-shaped large diameter portions, each having an equal distance from the central axis; and arc-shaped small diameter portions, each having a shorter distance from the central axis than the distance from the central axis to the large diameter portions. The first cage member and the second cage member are fastened to each other in a state in which the large diameter portions of the first cage member the small diameter portions of the second cage member overlap each other and the small diameter portions of the first cage member and the large diameter portions of the second cage member overlap each other.

To achieve the object, a second aspect of the present invention provides cage for a thrust roller bearing, the cage having an annular shape and retains a plurality of rollers in a rollable manner. The cage has a first cage member and a second cage member, each of the first cage member and the second cage member including an outer annular portion formed on a radially outer side of a plurality of retaining holes that retains the plurality of rollers; an inner annular portion formed on a radially inner side of the retaining holes; and a plurality of cage bar portions radially connecting the outer annular portion and the inner annular portion to each other to restrict an axial movement of the rollers. The first cage member and the second cage member are configured to have a same shape. Each of the inner annular portion of the first cage member and the inner annular portion of the second cage member includes a vertical portion having a planar and annular shape and extending perpendicular to an axial direction that is parallel to a central axis; and a flange portion extending axially from a radially inner end of the vertical portion and is circumferentially divided into a plurality of arc-shaped parts. The flange portion includes arc-shaped large diameter portions, each having an equal distance from the central axis; and arc-shaped small diameter portions, each having a shorter distance from the central axis than the distance from the central axis to the large diameter portions. The first cage member and the second cage member are fastened to each other in a state in which the large diameter portions of the first cage member and the small diameter portions of the second cage member overlap each other and the small diameter portions of the first cage member and the large diameter portions of the second cage member overlap each other.

To achieve the object, a third aspect of the present invention provides a cage for a thrust roller bearing, the cage having an annular shape and retains a plurality of rollers in a rollable manner. The cage has a first cage member and a second cage member, each of the first cage member and the second cage member including an outer annular portion formed on a radially outer side of a plurality of retaining holes that retains the plurality of rollers; an inner annular portion formed on a radially inner side of the retaining holes; and a plurality of cage bar portions radially connecting the outer annular portion and the inner annular portion to each other to restrict an axial movement of the rollers. The first cage member and the second cage member are configured to have a same shape. Each of the outer annular portion of the first cage member and the outer annular portion of the second cage member includes a vertical portion having a planar and annular shape and extending perpendicular to an axial direction that is parallel to a central axis; and a flange portion extending axially from a radially outer end of the vertical portion and is circumferentially divided into a plurality of arc-shaped parts. Each of the inner annular portion of the first cage member and the inner annular portion of the second cage member includes a vertical portion having a planar and annular shape and extending perpendicular to the axial direction that parallel to the central axis; and a flange portion extending axially from a radially inner end of the vertical portion and is circumferentially divided into a plurality of arc-shaped parts. Each of the flange portions includes arc-shaped large diameter portions, each having an equal distance from the central axis; and arc-shaped small diameter portions, each having a shorter distance from the central axis than the distance from the central axis to the large diameter portions. The first cage member and the second cage member are fastened to each other in a state in which the large diameter portions of the first cage member and the small diameter portions of the second cage member overlap each other and the small diameter portions of the first cage member and the large diameter portions of the second cage member overlap each other.

Advantages of Invention

According to an aspect of the invention, a cage for a thrust roller bearing and a thrust roller bearing to improve manufacturing process and reduce cost is provided.

BRIEF DESCRIPTION OF DRAWINGS

FIGS. 10A to 10D illustrate a thrust roller bearing according to a modification of the first embodiment, in which FIG. 10A is a plan view of a first cage member, FIG. 10B is a back view of a second cage member, FIG. 10C is a plan view of the thrust roller bearing combining the first and second cage members, and FIG. 10D is a cross-sectional view taken along a line H-H in FIG. 10C.

FIGS. 11A to 11D illustrate a thrust roller bearing according to a modification of the first embodiment, in which FIG. 11A is a plan view of a first cage member, FIG. 11B is a back view of a second cage member, FIG. 11C is a plan view of the thrust roller bearing combining the first and second cage members, and FIG. 11D is a cross-sectional view taken along a line I-I in FIG. 11C.

FIGS. 14A to 14D illustrate a first modification of the second embodiment, in which FIG. 14A is a plan view of a first cage member, FIG. 14B is a back view of a second cage member, FIG. 14C is a plan view of the thrust roller bearing combining the first and second cage members, and FIG. 14D is a cross-sectional view taken along a line L-L in FIG. 14C.

FIGS. 15A to 15D illustrate a second modification of the second embodiment, in which FIG. 15A is a plan view of a first cage member, FIG. 15B is a back view of a second cage member, FIG. 15C is a plan view of the thrust roller bearing combining the first and second cage members, and FIG. 15D is a cross-sectional view taken along a line M-M in FIG. 15C.

EMBODIMENTS OF INVENTION

First Embodiment

The first embodiment of the present invention and modifications thereof will be described with reference to FIGS. 1A to 11D. The embodiment described below is given as an appropriate example for carrying out the present invention and various preferable technical matters are specifically exemplified. However, the technical scope of the present invention is not limited to the specific embodiment.

Figure 1A:
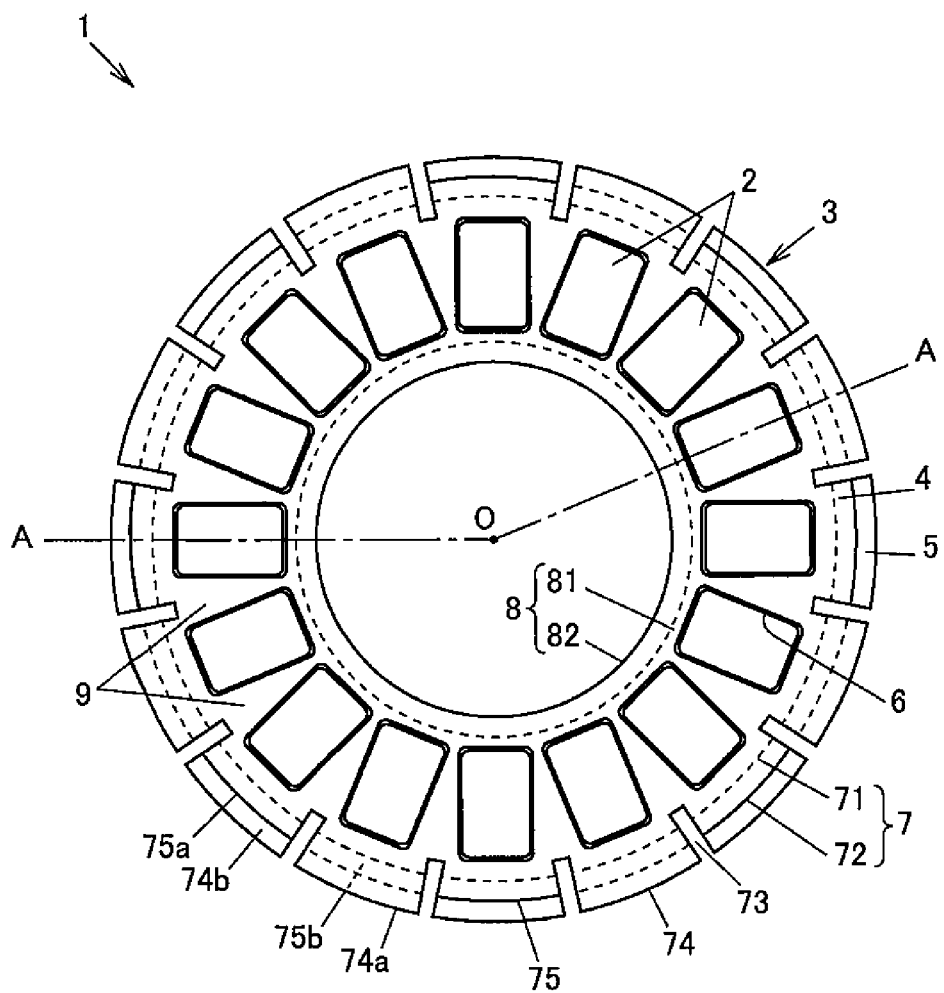
FIGS. 1A to 1C are plan views of a thrust roller bearing according to a first embodiment of the present invention.
Figure 1B:
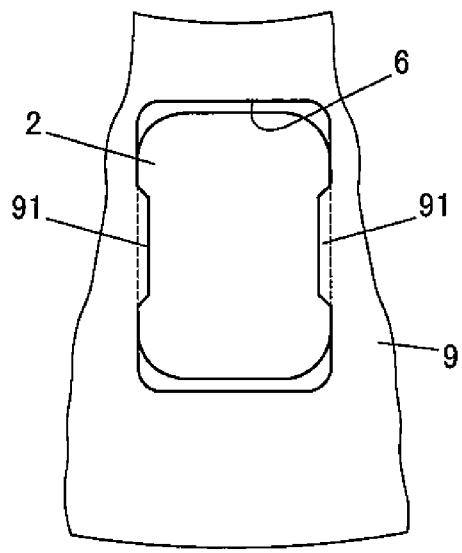
Figure 1C:
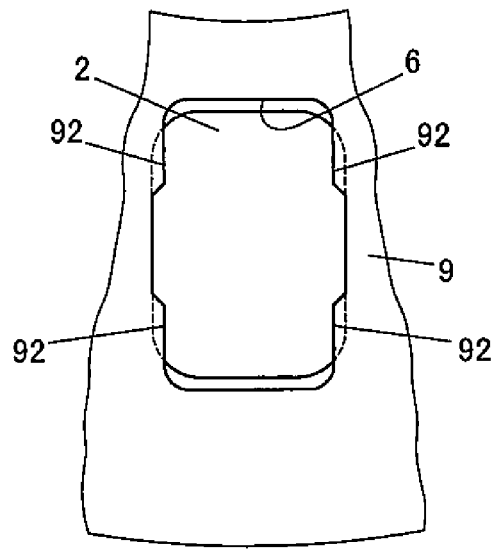
Figure 2A:
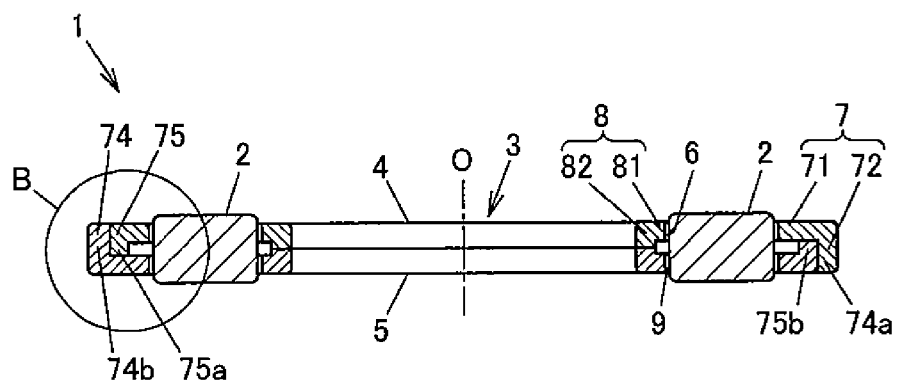
FIG. 2A is a cross-sectional view of the thrust roller bearing taken along a line A-A in FIG. 1.
Figure 2B:
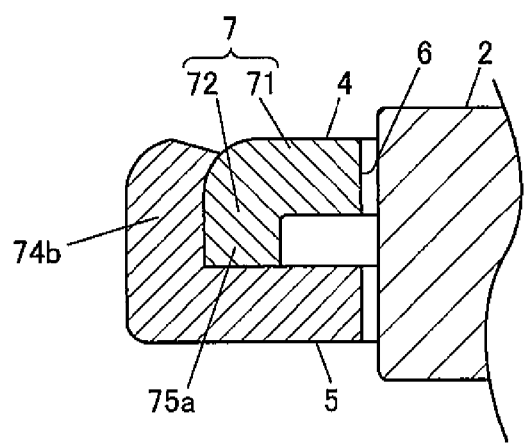
FIG. 2B is an enlarged view of a portion B in FIG. 2A.
Figure 2C:
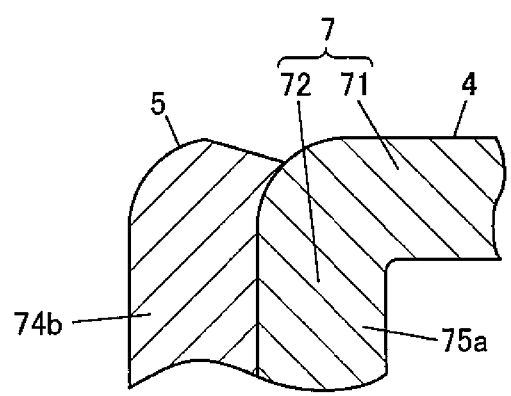
FIG. 2C is an enlarged view of a swaged part.

FIG. 1A is a plan view of a thrust roller bearing according to the present embodiment and FIGS. 1B and 1C illustrate modifications of a retaining hole. FIG. 2A is a cross-sectional view of the thrust roller bearing taken along a line A-A in FIG. 1, FIG. 2B is an enlarged view of a portion B in FIG. 1A, and FIG. 2C is an enlarged view of a swaged part.

(Overall Configuration of Thrust Roller Bearing 1)

As illustrated in FIGS. 1A to 1C and 2A to 2C, a thrust roller bearing 1 includes a plurality of rollers 2 shaped like cylinder and an annular cage (cage for thrust roller bearing) 3 to retain the plurality of rollers 2 in a rollable manner. Although not illustrated, the thrust roller bearing 1 includes a pair of races that face each other to sandwich the cage 3 and have raceway surfaces on which the plurality of rollers 2 roll.

The thrust roller bearing 1 is used for, for example, a transmission of a vehicle and is interposed between a shaft-shaped rotary member and a non-rotary member such as a transmission housing. The thrust roller bearing 1 facilitates rotation of the rotary member while receiving an axial thrust force by rolling of the plurality of rollers 2 held in the cage 3.

(Cage 3)

Figure 3A:
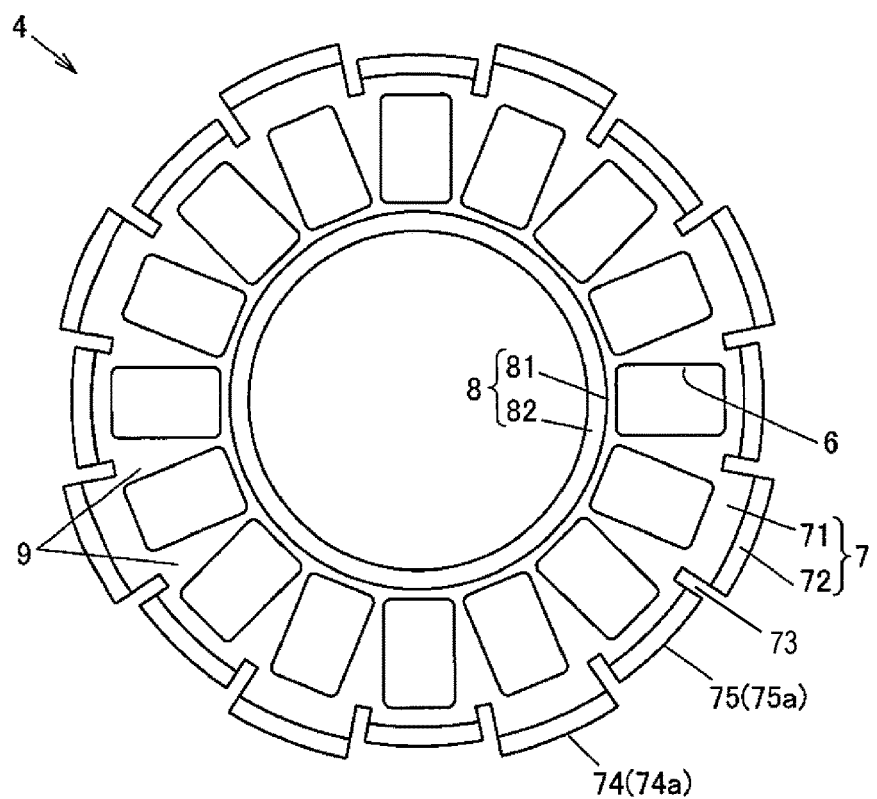
FIG. 3A is a plan view of a first cage and FIG. 3B is a plan view of a second cage.
Figure 3B:
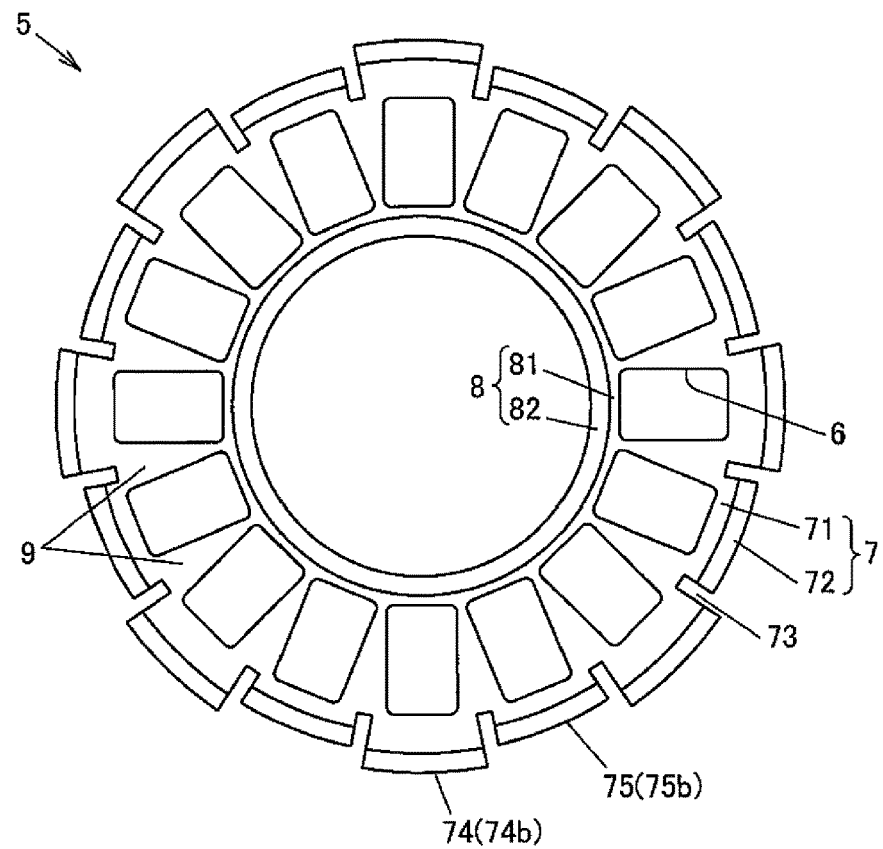

FIG. 3A is a plan view of a first cage member and FIG. 3B is a plan view of a second cage member. As illustrated in FIGS. 1A to 3B, the cage 3 is a double-plate cage including a first cage member 4 and a second cage member 5 in combination.

Both the first cage member 4 and the second cage member 5 are made of metal and are formed by punching such as pressing and bending a steel plate. Each of the first and second cage members 4, 5 includes an outer annular portion 7 formed on an outer side of a plurality of retaining holes 6 that retains the plurality of rollers 2, an inner annular portion 8 inward of the retaining holes 6, and a plurality of cage bar portions 9 radially connecting the outer annular portion 7 and the inner annular portion 8 to each other to restrict an axial movement of the rollers 2.

The retaining holes 6 are mainly rectangular through holes that pass through the first and second cage members 4, 5 in the thickness direction (axial direction). Long sides of the retaining holes 6 radially extend along the first and second cage members 4, 5. The same number of retaining holes 6 (16 in the present embodiment) as the plurality of rollers 2 are radially formed in the first and second cage members 4, 5, so that the plurality of radially disposed rollers 2 are rollably held. The width of the retaining holes 6 in short sides is smaller than the diameter of the rollers 2, so that the rollers 2 are prevented from separating the retaining holes 6.

As illustrated in FIGS. 1B and 1C, the rollers 2 may be retained by protrusions provided in the cage bar portions 9. In the example of FIG. 1B, the rollers 2 are retained by a pair of protrusions 91 that face each other on radial middle portions of the retaining holes 6 of the first and second cage members 4, 5. In the example of FIG. 1C, the rollers 2 are retained by a pair of protrusions 92 provided respectively on two radial end portions of the retaining holes 6 of the first and second cage members 4, 5. In these modifications, a circumferential interval between the protrusions 91 and 92 of the first and second cage members 4, 5 is smaller than the diameter of the rollers 2. That is, the width of the retaining holes 6 in the short sides may be smaller than the diameter of the rollers 2 at least in a part of the retaining holes 6.

The inner annular portion 8 integrally includes a planar annular vertical portion 81 extending perpendicularly to an axial direction parallel to a central axis O, and a short cylindrical flange portion 82 axially extending from an inner peripheral end portion of the vertical portion 81. The connection part between the vertical portion 81 and the flange portion 82 has a rounded shape.

The outer annular portion 7 integrally includes a planar annular vertical portion 71 extending perpendicularly to an axial direction parallel to the central axis O, and a flange portion 72 axially extending from a radially outer end of the vertical portion 71. The connection part between the vertical portion 71 and the flange portion 72 has a rounded shape. Details of the flange portion 72 will be described below.

The vertical portion 71 of the outer annular portion 7 and the vertical portion 81 of the inner annular portion 8 are coaxial in the same axial position. The flange portion 72 of the outer annular portion 7 and the flange portion 82 of the inner annular portion 8 axially extend in the same direction from the vertical portions 71, 81. The cage bar portions 9 are perpendicular to the axial direction (along the radial direction) and connect the vertical portions 71, 81 of the two annular portions 7 and 8 to each other.

(Flange Portion 72 of Outer Annular Portion 7)

In the cage 3 according to the present embodiment, the flange portion 72 of the outer annular portion 7 of the first and second cage members 4, 5 is circumferentially divided into a plurality of arc-shaped parts. The flange portion 72 includes arc-shaped large diameter portions 74 having equal distances from the central axis O and arc-shaped small diameter portions 75 having shorter distances from the central axis O than the distances of the large diameter portions 74. In the present embodiment, a plurality of large diameter portions 74 and a plurality of small diameter portions 75 are provided circumferentially alternately. The large diameter portions 74 and the small diameter portions 75 each have a virtual coaxial cylindrical shape that takes the central axis O as an axis.

The outer diameter of the small diameter portions 75 (distances of outer peripheral surfaces from the central axis O) is slightly smaller than the inner diameter of the large diameter portions 74 (distances of inner peripheral surfaces from the central axis O). Hereinafter, the large diameter portions 74 and the small diameter portions 75 of the first cage member 4 are referred to as large diameter portions 74*a* and small diameter portions 75*a*; the large diameter portions 74 and the small diameter portions 75 of the second cage member 5 are referred to as large diameter portions 74*b* and small diameter portions 75*b*.

In the present embodiment, components are commonly used to simplify the manufacturing process and reduce the cost by forming the first cage member 4 and the second cage member 5 into the same shape. In order to form the two cage members 4, 5 in the same shape, the large diameter portions 74 and the small diameter portions 75 are separately formed in the flange portion 72 of the two cage members 4, 5. The two cage members 4, 5 are positioned with respect to each other while the large diameter portions 74*a* of the first cage member 4 overlap the small diameter portions 75*b* of the second cage member 5 and the small diameter portions 75*a* of the first cage member 4 overlap the large diameter portions 74*a* of the second cage member 5.

As illustrated in FIG. 2C, the two cage members 4, 5 are fastened together by swaging, by deforming tip end portions of the large diameter portions 74 radially inward. More specifically, the two cage members 4, 5 are fastened to each other by deforming the tip end portions of the large diameter portions 74 radially inward and locking the tip end portions on base end portions (bent parts) of the small diameter portions 75. The tip end portions of the large diameter portions 74 are slightly deformed in a tapered manner by the swaging. It is desirable that the tip end portion of each large diameter portion 74 do not protrude axially outward from the cage member 4, 5 (cage bar portions 9 and vertical portion 71) on which they are fastened by the swaging. At this time, the large diameter portions 74*a* of the first cage member 4 or the large diameter portions 74*b* of the second cage member 5 may be swaged to provide a single-sided swaging, or both of them may be swaged to provide a double-sided swaging. The selection of the single-sided swaging and the double-sided swaging may depend on application of the thrust roller bearing 1 (required holding force of the two cage members 4, 5) and the like. In a case of the double-sided swaging, substantially the entire periphery of the cage 3 is fastened by swaging. Accordingly, substantially the same holding force can be obtained, as in the conventional art where an outer periphery of an outer cage is fastened to an inner cage by swaging.

When the two cage members 4, 5 are combined, tip end portions of the small diameter portions 75a, 75b are brought into contact with the vertical portion 71. The small diameter portions 75a, 75b have a function of defining the axial positional relationship between the two cage members 4, 5 by abutting the tip end portions thereof to the vertical portion 71. The large diameter portions 74a, 74b need to cover the entire small diameter portions 75b, 75a (the tip end portions of the large diameter portions 74a need to extend to a base end portion of the vertical portion 71 so as to perform the swaging). Accordingly, the axial extension length of the large diameter portions 74a, 74b from the vertical portion 71 is larger than the axial extension length of the small diameter portions 75a, 75b from the vertical portion 71.

The flange portion 72 is circumferentially divided by slits 73. The slits 73 extend to an intermediate portion of the vertical portion 71 from the flange portion 72. The vertical portion 71 is not circumferentially divided by the slits 73. The slits 73 are formed between the large diameter portions 74 and the small diameter portions 75 adjacent to each other, so as to facilitate bending of the large diameter portions 74 and the small diameter portions 75 and prevent deformation of the vertical portion 71 accompanying the bending from affecting the shape in the vicinity. In other embodiments and modifications described below, the slits 73 may be appropriately provided in all cases where deformation of the retaining holes 6, the cage bar portions 9, and the vertical portions 71, 81 by bending the flange portions 72, 82 is not desired.

If the slits 73 are formed at positions coinciding with the retaining holes 6 with respect to a circumferential direction (i.e., the positions on a radially outer side of the respective retaining holes 6), the vertical portion 71 between the slits 73 and the retaining holes 6 is narrowed and the mechanical strength may decrease, and a distortion may occur in the retaining holes 6 due to interference with the rollers 2 when the large diameter portions 74a and the small diameter portions 75b are bent. In order to prevent such a distortion, it is desirable that the flange portion 72 be divided at positions coinciding with the cage bar portions 9 with respect to the circumferential direction. Herein "the positions coinciding with the cage bar portions 9 with respect to the circumferential direction" refer to circumferential positions where the cage bar portions 9 are disposed, in other words, positions on a radially outer side of the respective cage bar portions 9.

In order to match divided positions (circumferential positions) of the flange portion 72 with the positions (circumferential positions) of the cage bar portions 9, the number of parts into which the flange portion 72 divided is preferably equal to or less than the number of the cage bar portions 9, that is, the number of retaining holes 6. Since at least one of the large diameter portions 74 and at least one of the small diameter portions 75 are necessary, the number parts into which the flange portion 72 is divided is preferably equal to or less than the number of the two or more retaining holes 6. In the present embodiment, the number of parts into which the flange portion 72 is divided is 16 and equal to the number of the retaining holes 6. A case where the retaining holes 6 are formed in a circumferential row has been described herein. However, when the retaining holes 6 are formed in two rows on inner and outer peripheral sides, for example, the number of parts into which the flange portion 72 is divided may be equal to or less than the number of the retaining holes 6 disposed on the outer peripheral side.

The divided positions of the flange portion 72 do not necessarily match with the positions of the cage bar portions 9. For example, when 16 retaining holes 6 are provided, the number of parts into which the flange portion 72 is divided may be 3, 21, and the like. Although a case where the number of the retaining holes 6 is 16 and an even number has been described herein, the number of the retaining holes 6 may be an odd number.

(Modifications of Flange Portion 72 of Outer Annular Portion 7)

In the present embodiment, the large diameter portions 74 and the small diameter portions 75 are formed by circumferentially equally dividing the flange portion 72 into the same number of parts (herein eight respectively), and are provided circumferentially alternately. The total number of the large diameter portions 74 and the small diameter portions 75 of the flange portion 72 is the same as the number of the retaining holes 6. However, circumferential lengths (sizes of central angles) of the large diameter portions 74 and the small diameter portions 75 may be different from each other as long as the first cage member 4 and the second cage member 5 having the same shape can be combined.

Figure 4A:
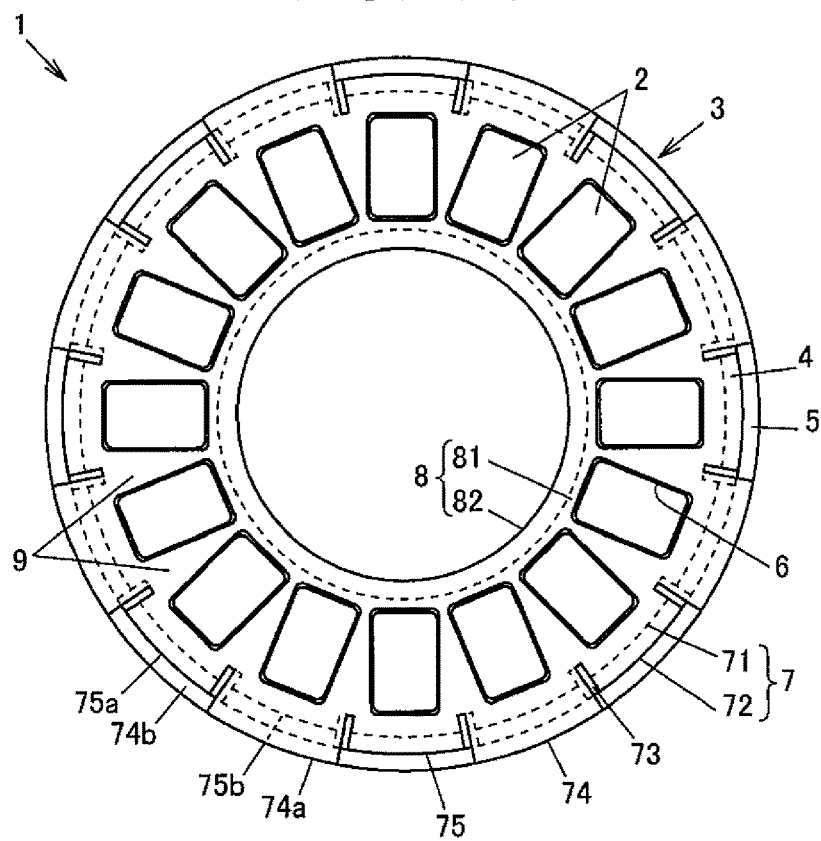
FIG. 4A is a plan view of a thrust roller bearing according to a modification of the first embodiment.
Figure 4B:
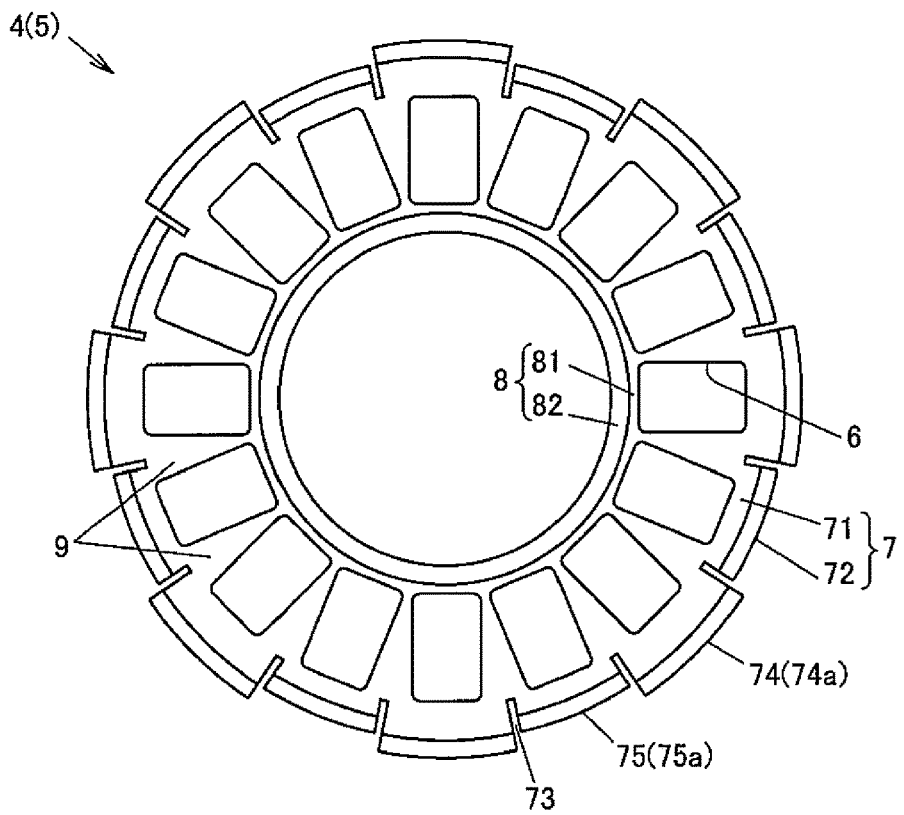
FIG. 4B is a plan view of a first cage thereof.

For example, as illustrated in FIGS. 4A and 4B, the circumferential length of the large diameter portions 74 may be larger than the circumferential length of the small diameter portions 75. In the example of FIGS. 4A and 4B, the circumferential length of the large diameter portions 74 is equal to the circumferential length of a gap between circumferentially adjacent large diameter portions 74. When the cage members 4, 5 are combined, the large diameter portions 74 of the cage members 4, 5 are circumferentially disposed without gaps. Accordingly, the flange portion 72 has a cylindrical shape as a whole without steps. Therefore, it is possible to prevent abnormal noise during use due to interference between the flange portion 72 and a member to which the thrust roller bearing 1 is attached (or races provided on outer sides of the cage members 4, 5).

Figure 5A:
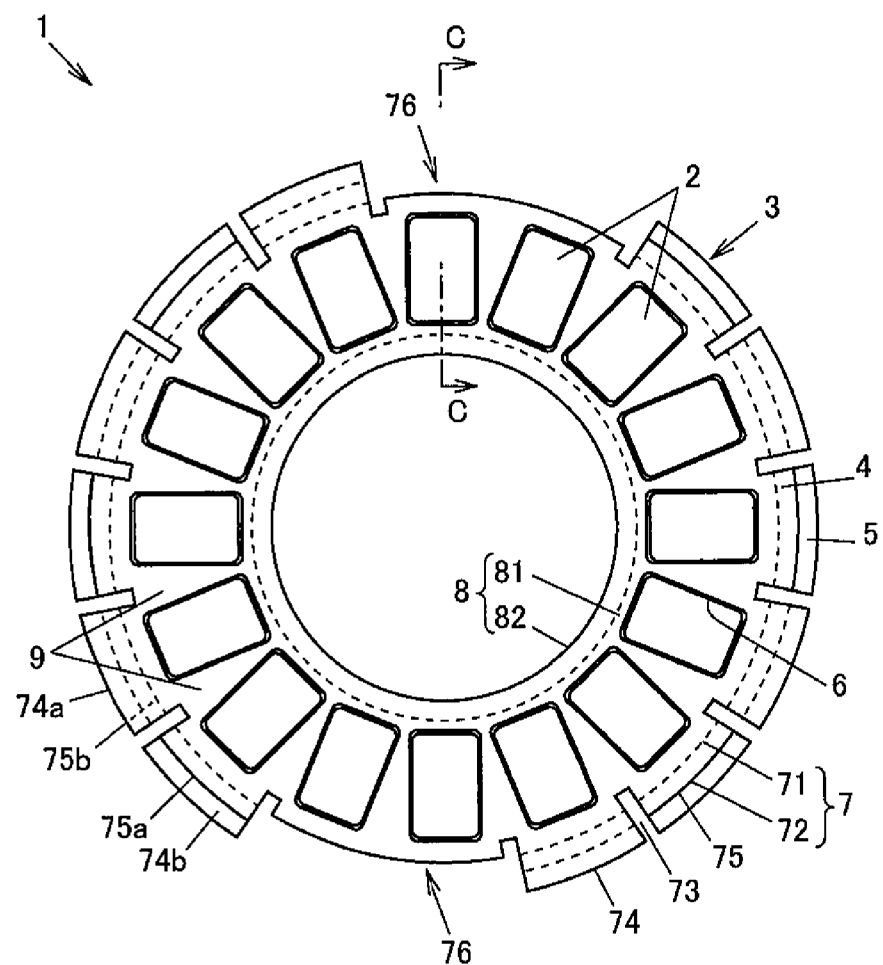
FIG. 5A is a plan view of a thrust roller bearing according to a modification of the first embodiment.
Figure 5B:
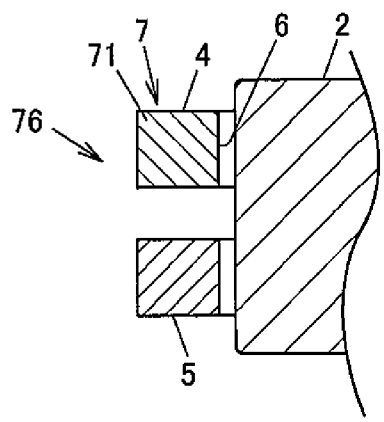
FIG. 5B is a cross-sectional view taken along a line C-C in FIG. 5A.

As illustrated in FIGS. 5A and 5B, the first and second cage members 4, 5 may include a lacking portion (cutout portion) 76 where the flange portion 72 is not provided. FIGS. 5A and 5B illustrate a case where the flange section 72 is equally divided into 16 sections and two adjacent sections of the equally divided sections, as well as two sections radially facing the two adjacent sections, are referred to as lacking portions 76. However, positions and sizes of the defective sections 76 are not limited thereto, and can be appropriately adjusted so that the cage members 4, 5 have the same shape.

Figure 6A:
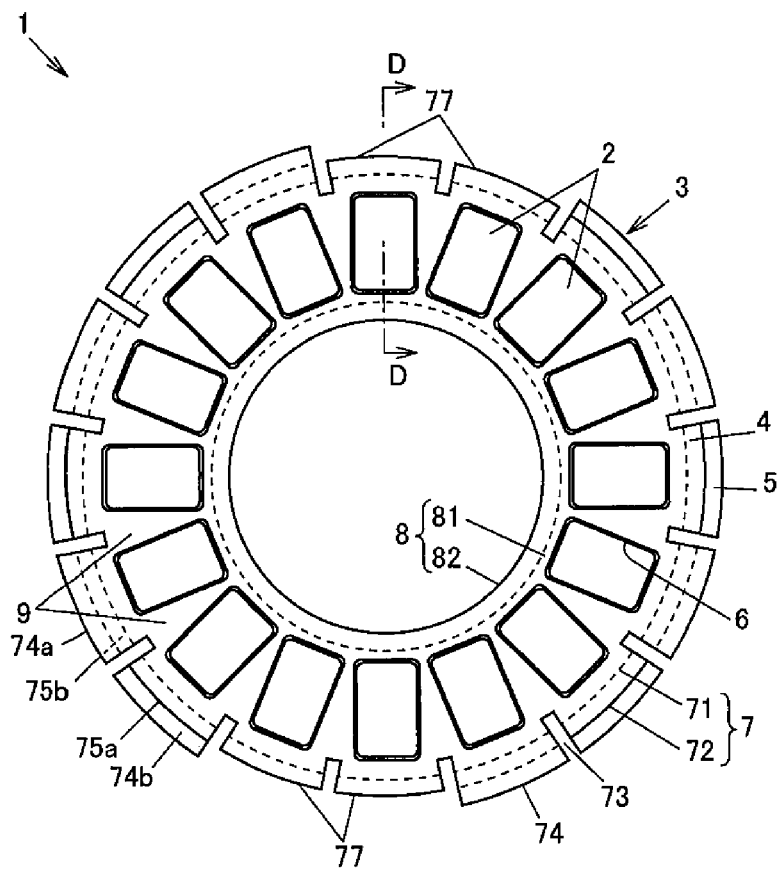
FIG. 6A is a plan view of a thrust roller bearing according to a modification of the first embodiment.
Figure 6B:
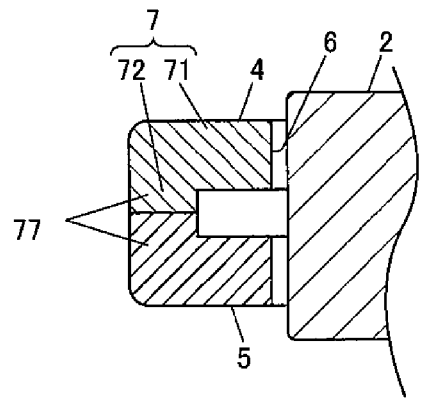
FIG. 6B is a cross-sectional view taken along a line D-D in FIG. 6A.

As illustrated in FIGS. 6A and 6B, the flange portions 72 may include non-overlapping portions 77 that do not overlap when the first and second cage members 4, 5 are combined. In the example of FIGS. 6A and 6B, the non-overlapping portions 77 of the first and second cage members 4, 5 have the same inner and outer diameters; tip end surfaces of the non-overlapping portions 77 abut each other when the first and second cage members 4, 5 are combined. The present invention is not limited thereto, however, and the inner and outer diameters of the non-overlapping portions 77 of the cage members 4, 5 may be different from each other, or a gap may be formed between the non-overlapping portions 77 when the cage members 4, 5 are combined.

Further, when the two cage members 4, 5 are combined, the large diameter portions 74 and the small diameter portions 75 may face the lacking portions 76. That is, when the two cage members 4 are combined, there may be a large diameter portion 74 that does not overlap the small diameter portions 75 and a small diameter portion 75 that does not overlap the large diameter portions 74. In this case, the large diameter portion 74 and the small diameter portion 75 facing the lacking portions 76 form the non-overlapping portions 77. The large diameter portions 74 and the small diameter portions 75 may not be of the same number. The number of parts into which the flange portion 72 is divided is not limited to an even number, and may be an odd number.

(Modifications of Flange Portion 82 of Inner Annular Portion 8)

In the present embodiment, the flange portions 82 of the inner annular portions 8 of the first and second cage members 4, 5 have the same inner and outer diameters. Tip end surfaces of the flange portions 82 abut each other when the first and second cage members 4, 5 are combined. When the two cage members 4, 5 are combined, however, a gap may be formed between the flange portions 82.

Figure 7A:
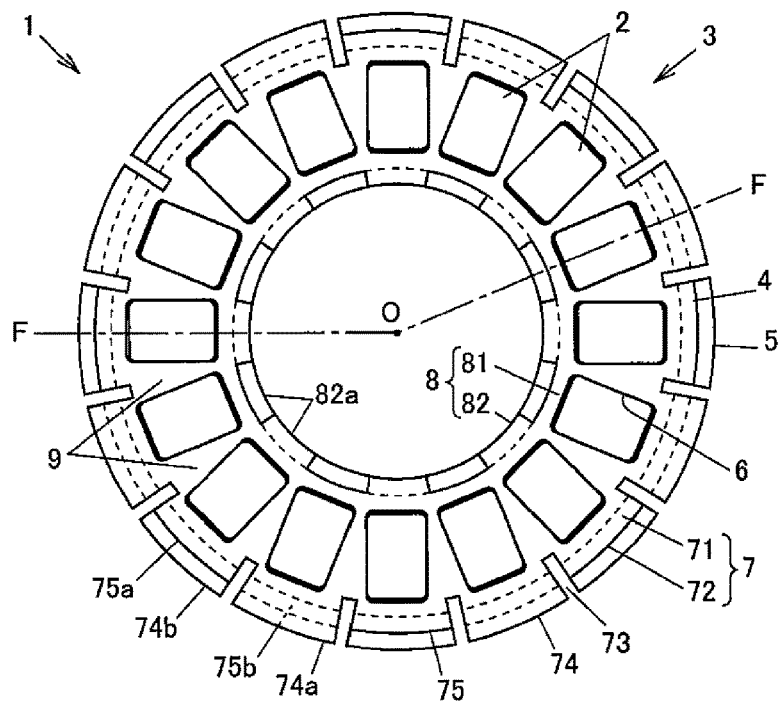
FIG. 7A is a plan view of a thrust roller bearing according to a modification of the first embodiment.
Figure 7B:
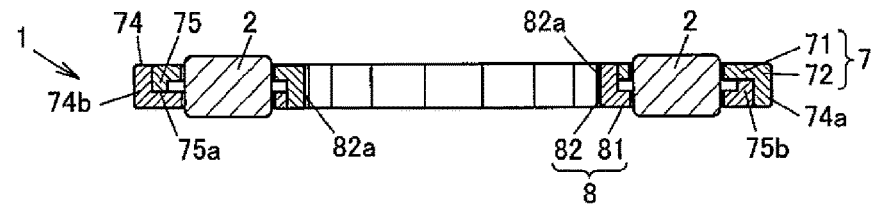
FIG. 7B is a cross-sectional view taken along a line F-F.
Figure 7C:
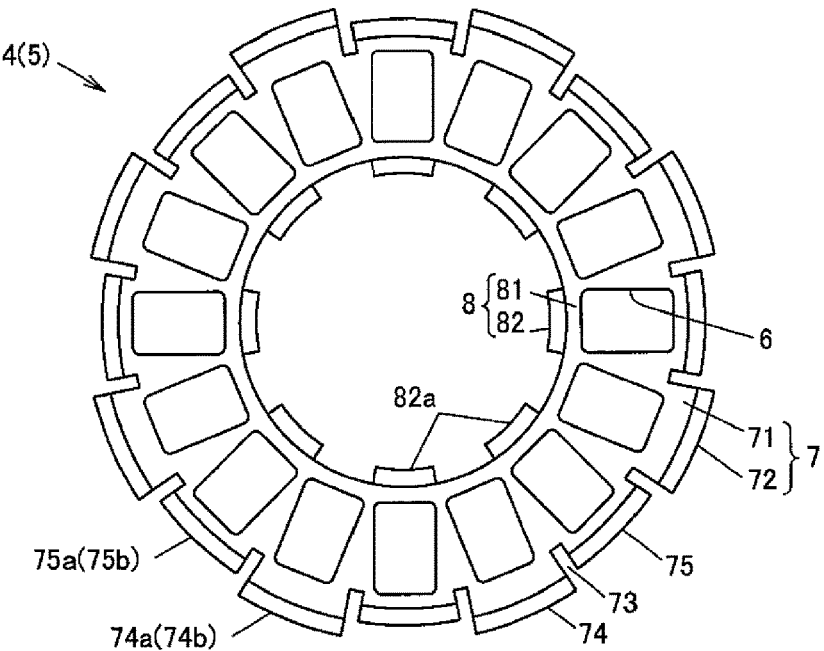
FIG. 7C is a plan view of a first cage thereof.

When the thickness of a metal plate used for the cage members 4, 5 is large and it is difficult to form the short cylindrical flange portion 82, as illustrated in FIGS. 7A to 7C, the flange portion 82 may be circumferentially divided such that arc-shaped segments 82a are circumferentially disposed at predetermined intervals to improve processability. In the example of FIGS. 7A to 7C, the segments 82a are respectively formed at positions radially facing the small diameter portions 75. When the two cage members 4, 5 are combined, the segments 82a of one cage member 4 (or 5) are inserted into gaps between the segments 82a of the other cage member 5 (or 4). Tip end portions of the segments 82a abut a side surface (radially inner end surface) of the vertical portion 81. However, the number and positions of the segments 82a are not limited thereto. The tip end portions of the segments 82a may not abut the vertical portion 81. A slit may be appropriately provided at a base of the flange portion 82.

Further, in the example of FIGS. 7A to 7C, the circumferential length of the segments 82a is equal to the circumferential length of the gaps between adjacent segments 82a. When the two cage members 4, 5 are combined, the segments 82a of one cage member 4 (or 5) and the segments 82a of the other cage member 5 (or 4) adjacent thereto are disposed without gaps. Accordingly, the flange portion 82 has a cylindrical shape as a whole without steps. Therefore, it is possible to prevent abnormal noise during use due to interference between the flange portion 82 and a member to which the thrust roller bearing 1 is attached (or races provided on inner sides of the cage members 4, 5). A slit may be appropriately provided at a base of the flange portion 82.

Figure 8A:
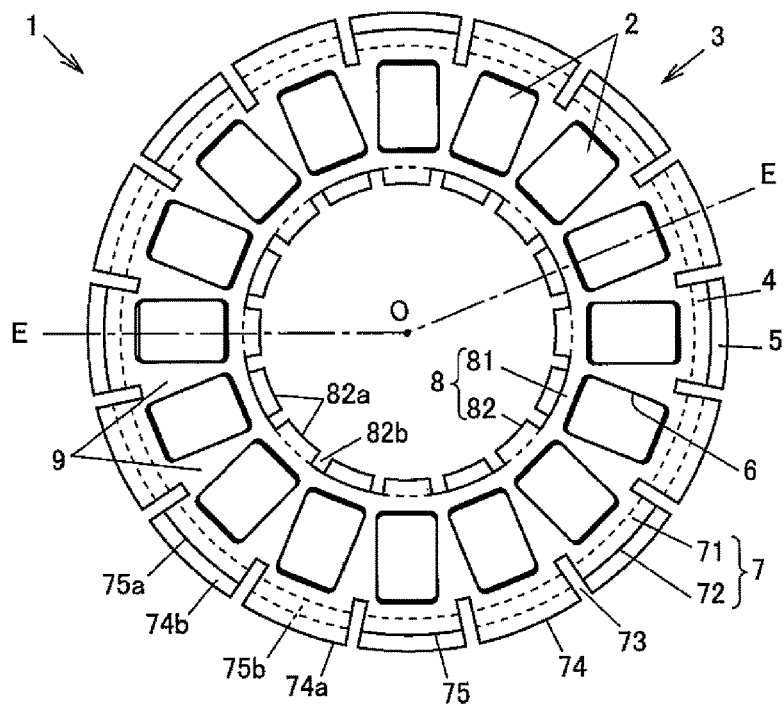
FIG. 8A is a plan view of a thrust roller bearing according to a modification of the first embodiment.
Figure 8B:
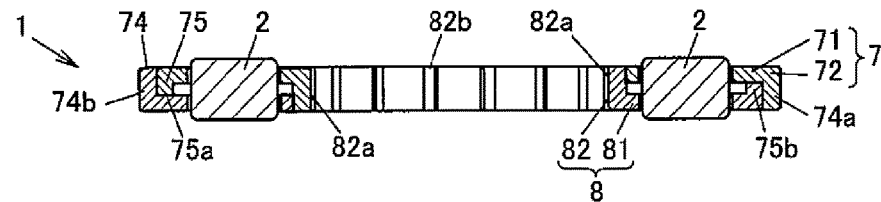
FIG. 8B is a cross-sectional view taken along a line E-E.
Figure 8C:
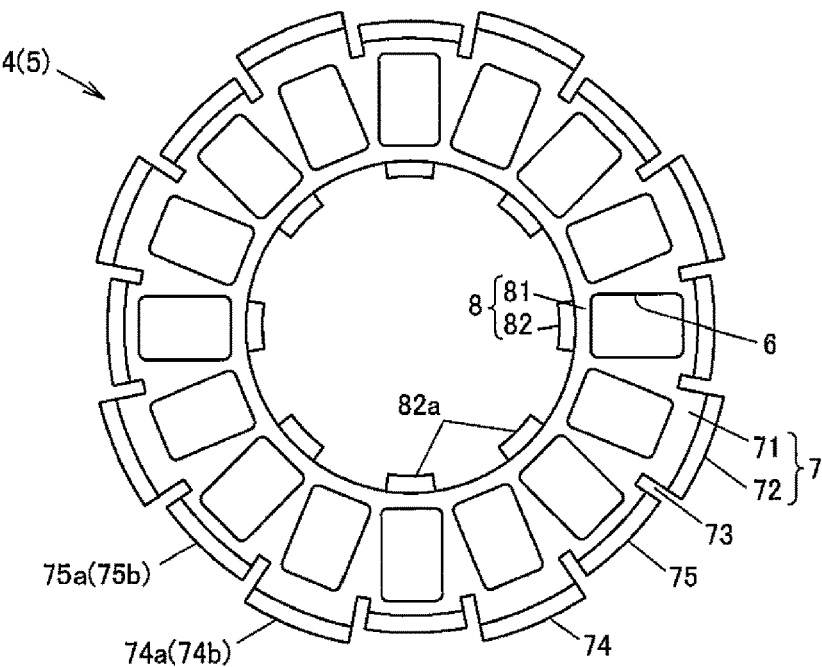
FIG. 8C is a plan view of a first cage thereof.

As illustrated in FIGS. 8A to 8C, when the two cage members 4, 5 are combined, there may be a gap between the segments 82a of one cage member 4 (or 5) and the segments 82a of the other cage member 5 (or 4) adjacent thereto. The two cage members 4, 5 are combined easily with the gap.

Figure 9A:
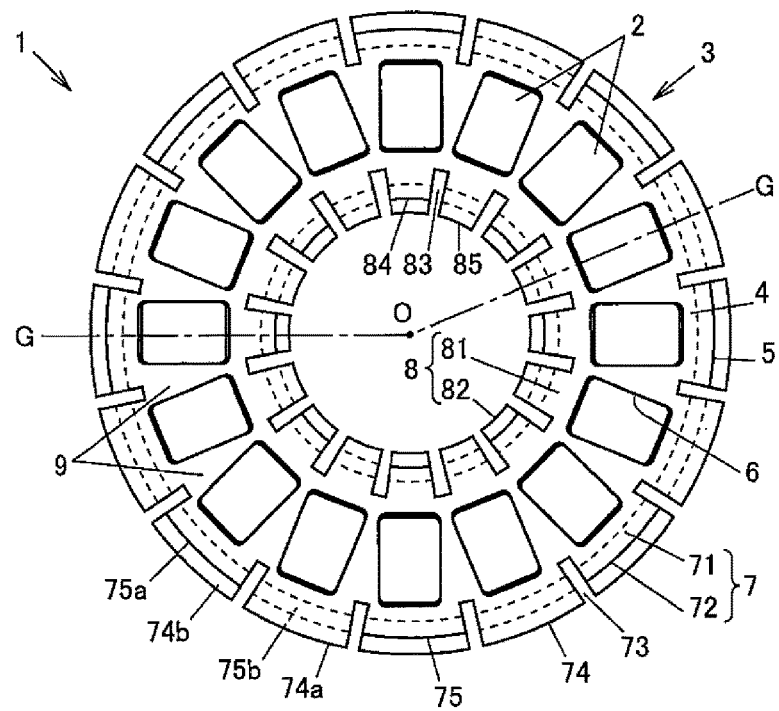
FIG. 9A is a plan view of a thrust roller bearing according to a modification of the first embodiment.
Figure 9B:
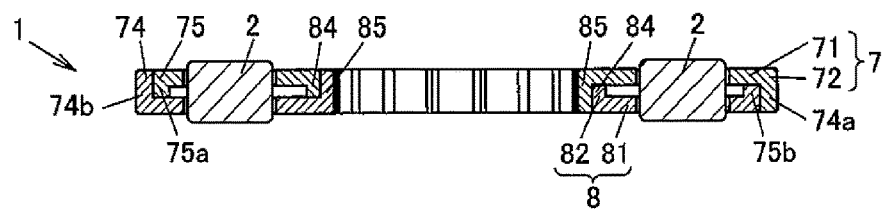
FIG. 9B is a cross-sectional view taken along a line G-G.
Figure 9C:
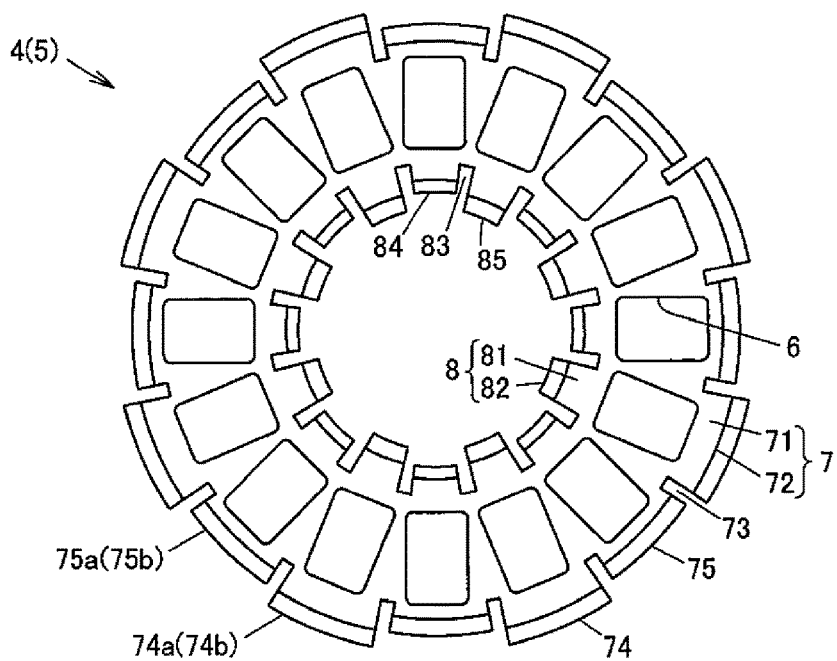
FIG. 9C is a plan view of a first cage thereof.

As illustrated in FIGS. 9A to 9C, the flange portion 82 of the inner annular portion 8 of the cage members 4, 5 may be divided into a plurality of parts by slits 83; the flange portion 82 may include a plurality of large diameter portions 84 and a plurality of small diameter portions 85. That is, in the modification illustrated in FIGS. 9A to 9C, the flange portion 82 of the inner annular portion 8 of the cage members 4, 5 is circumferentially divided into a plurality of arc-shaped parts. The flange portion 82 includes the arc-shaped large diameter portions 84 having equal distances from the central axis O and the arc-shaped small diameter portions 85 having shorter distances from the central axis O than the distances of the large diameter portions 84. The first cage member 4 and the second cage member 5 are fastened to each other while the large diameter portions 84 of the first cage member 4 overlap the small diameter portions 85 of the second cage member 5 and the small diameter portions 85 of the first cage member 4 overlap the large diameter portions 84 of the second cage member 5. The flange portion 82 may include the above-described lacking portions or non-overlapping portions.

By deforming tip end portions of the small diameter portions 85 radially outward, the inner diameter side of the cage 3 may also be fastened by swaging. At this time, the small diameter portions 85 of both of the cage members 4, 5 may be deformed to provide a double-sided swaging, or the small diameter portions 85 of only one of the cage members 4, 5 may be deformed to provide a single-sided swaging. The swaging of the small diameter portions 85 may be omitted, and the cage members 4, 5 may be fastened to each other by swaging only the outer annular portion 7. The outer side may also be either double-sided swaging or single-sided swaging.

In the example of FIGS. 9A to 9C, the small diameter portions 85 of the flange portion 82 of the inner annular portion 8 are provided on a radially inner side of the respective large diameter portions 74 of the flange portion 72 of the outer annular portion 7; the large diameter portions 84 of the flange portion 82 of the inner annular portion 8 are provided on a radially inner side of the respective small diameter portions 75 of the flange portion 72 of the outer annular portion 7.

Figure 10A:
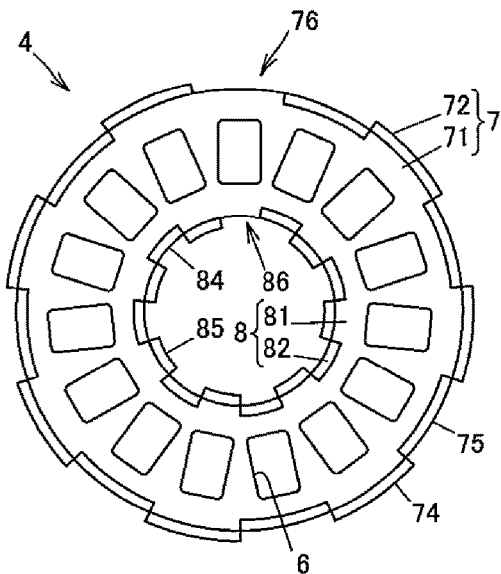
Figure 10B:
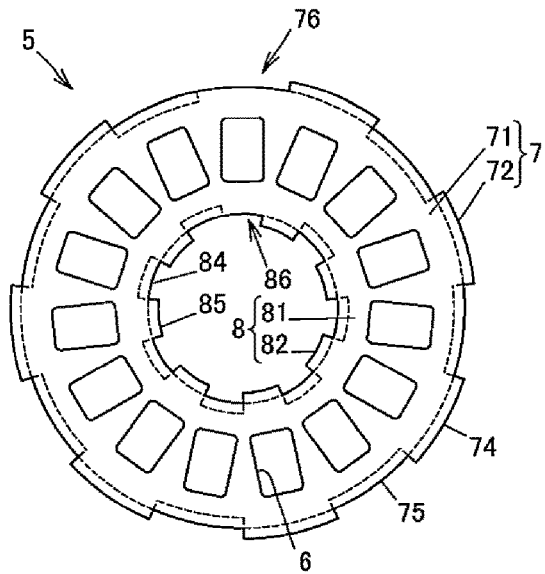
Figure 10C:
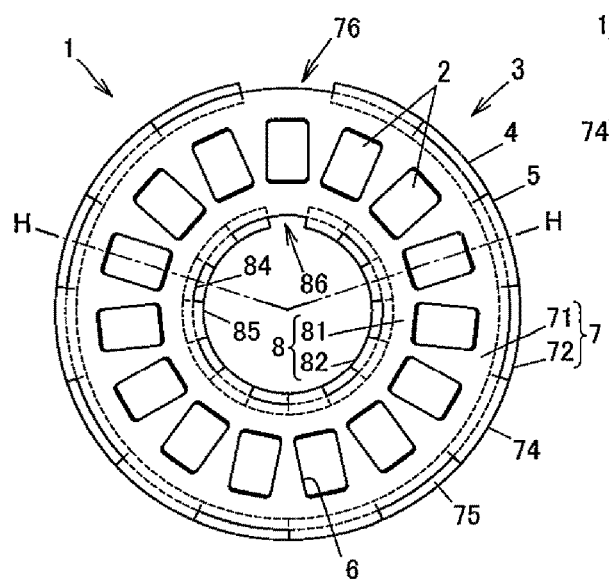
Figure 10D:
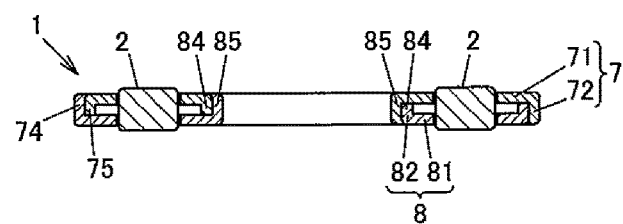

The modification illustrated in FIGS. 9A to 9C may be further modified to that illustrated in FIGS. 10A to 10D. FIG. 10A illustrates a front view of the first cage member 4, and FIG. 10B illustrates a back view of the second cage member 5. FIG. 10C illustrates the thrust roller bearing 1 combining the first and second cage members 4, 5, and FIG. 10D illustrates a cross-sectional view taken along a line H-H in FIG. 10C.

FIGS. 9A to 9C illustrate a case where: the flange portion 72 of the outer annular portion 7 is divided into a plurality of large diameter portions 74 and a plurality of small diameter portions 75 by the slits 73; the flange portion 82 of the inner annular portion 8 is divided into a plurality of large diameter portions 84 and a plurality of small diameter portions 85 by the slits 83; and the total number of the large diameter portions 74 and the small diameter portions 75 in the flange portion 72, as well as the total number of the large diameter portions 84 and the small diameter portions 85 in the flange portion 82, is the same as the number of the retaining holes 6. However, in the example of FIGS. 10A to 10D, the flange portion 72 of the outer annular portion 7 is divided into a plurality of large diameter portions 74 and a plurality of small diameter portions 75 without the slits 73; the flange portion 82 of the inner annular portion 8 is divided into a plurality of large diameter portions 84 and a plurality of small diameter portions 85 without the slits 83; and the total number of the large diameter portions 74 and the small diameter portions 75 in the flange portion 72, as well as the total number of the large diameter portions 84 and the small diameter portions 85 in the flange portion 82, is one less than the number of the retaining holes 6. Specifically, the large diameter portions 74 and the small diameter portions 75 of the flange portion 72 as well as the large diameter portions 84 and the small diameter portions 85 of the flange portion 82 are seven, respectively, while the number of the retaining holes 6 is 15. The slits 73, 83 may be provided as appropriate.

In this manner, the lacking portions 76, 86 are formed on a radially outer side and a radially inner side of one of the plurality of retaining holes 6, since the total number of the large diameter portions 74 and the small diameter portions 75 in the flange portion 72, as well as the total number of the large diameter portions 84 and the small diameter portions 85 in the flange portion 82, is one less than the number of the retaining holes 6. Similarly to the embodiment and modifications in FIG. 1A to FIG. 9C, a gap may be provided.

Circumferential lengths of the large diameter portions 74 of the flange portion 72 of the first and second cage members 4, 5 are equal to each other; circumferential lengths of the plurality of small diameter portions 75 are also equal to each other. When the first and second cage members 4, 5 are combined, the plurality of large diameter portions 74 of the first cage member 4 and the plurality of large diameter portions 74 of the second cage member 5, and the plurality of small diameter portions 75 of the first cage member 4 and the plurality of small diameter portions 75 of the second cage member 5, are meshed with each other without gaps. Similarly to the embodiment and modifications in FIG. 1A to FIG. 9C, a gap may be provided.

Similarly, circumferential lengths of the large diameter portions 84 of the flange portion 82 of the first and second cage members 4, 5 are equal to each other; circumferential lengths of the plurality of small diameter portions 85 are also equal to each other. When the first and second cage members 4, 5 are combined, the plurality of large diameter portions 84 of the first cage member 4 and the plurality of large diameter portions 84 of the second cage member 5, and the plurality of small diameter portions 85 of the first cage member 4 and the plurality of small diameter portions 85 of the second cage member 5, are meshed with each other without gaps.

As illustrated in FIGS. 11A to 11D, the modification illustrated in FIGS. 10A to 10D may be further modified to eliminate the lacking portion 76. FIG. 11A illustrates a front view of the first cage member 4, and FIG. 11B illustrates a back view of the second cage member 5. FIG. 11C illustrates the thrust roller bearing 1 combining the first and second cage members 4, 5, and FIG. 11D illustrates a cross-sectional view taken along a line I-I in FIG. 11C.

In the modification illustrated in FIGS. 11A to 11D, circumferential lengths of the large diameter portion 74 and the small diameter portion 75 in the modification illustrated in FIGS. 10A to 10D, which sandwich a part where the lacking portion 76 is formed in the flange portion 72 of the outer annular portion 7, are increased to eliminate the lacking portion 76. Circumferential lengths of the large diameter portion 84 and the small diameter portion 85 in the modification illustrated in FIGS. 10A to 10D, which sandwich a part where the lacking portion 86 is formed in the flange portion 82 of the inner annular portion 8, are increased to eliminate the lacking portion 86. Accordingly, circumferential lengths of the plurality of large diameter portions 74, 84 of the flange portions 72, 82 are not uniform, and circumferential lengths of one pair of large diameter portions 74, 84 are larger than circumferential lengths of the other large diameter portions 74, 84. Further, circumferential lengths of the plurality of small diameter portions 75, 85 of the flange portions 72, 82 are not uniform, and circumferential lengths of one pair of small diameter portions 75, 85 are larger than circumferential lengths of the other small diameter portions 75, 85. The pair of large diameter portions 74, 84, which is longer than the other large diameter portions 74, 84, and the pair of small diameter portions 75, 85, which is longer than the other small diameter portions 75, 85, are divided at positions on a radially outer side and radially inner side of the retaining hole 6. The slits 73, 83 may be provided as appropriate. Similarly to the embodiment and modifications in FIG. 1A to FIG. 9C, a gap may be provided in the circumferential direction.

While description has been made based on the premise that the swaging is performed at the outer annular portion 7, the swaging at the outer annular portion 7 may be omitted when swaging is performed at the inner annular portion 8. In this case, the flange portion 72 of the outer annular portion 7 may not include the large diameter portions 74 or the small diameter portions 75. For example, the flange portions 72 of the outer annular portions 7 may have a short cylindrical shape; tip end surfaces of the flange portions 72 may abut each other when the first and second cage members 4, 5 are combined (that is, the flange portion 82 of the inner annular portion 8 in FIG. 2A may have the same configuration). Further, the flange portion 72 of the outer annular portion 7 may be circumferentially divided to obtain a plurality of segments, so as to improve processability (see FIGS. 7A to 7C and FIGS. 8A to 8C). In this manner, at least one of the flange portion 72 of the outer annular portion 7 and the flange portion 82 of the inner annular portion 8 may have large diameter portions and small diameter portions.

(Operation and Effects of First Embodiment and Modifications Thereof)

According to the first embodiment and the modifications thereof described above, the following operations and effects can be obtained.

(1) In the cage 3, the large diameter portions 74 and the small diameter portions 75 are respectively formed in the flange portions 72 of the first and second cage members 4, 5. The first cage member 4 and the second cage member 5 are fastened to each other while the large diameter portions 74 of the first cage member 4 overlap the small diameter portions 75 of the second cage member 5 and the small diameter portions 75 of the first cage member 4 overlap the large diameter portions 74 of the second cage member 5. This allows the first cage member 4 and the second cage member 5 to be shared with the same shape (the same design), that is, the number of components as well as manufacturing steps can be reduced, resulting in simplified manufacturing process and reduced cost as compared with a case of using two cages having different shapes in the conventional art. Since the flange portion 72 is divided into the large diameter portions 74 and the small diameter portions 75, tip ends of the large diameter portions 74 are easily deformed during the swaging, resulting in improved swaging performance.

(2) Since the flange portion 72 is divided at positions coinciding with the cage bar portions 9 with respect to the circumferential direction, it is possible to prevent a decrease in the mechanical strength of the outer annular portion 7 due to the slits 73. For example, it is possible to prevent such a problem that the retaining holes 6 are distorted to interfere with the roller 2 when the flange portion 72 is bent.

(3) Since the number of parts into which the flange portion 72 is divided is equal to or less than the number of two or more retaining holes 6, the divided positions of the flange portion 72 can overlap the cage bar portions 9 and at least one large diameter portion 74 and at least one small diameter portion 75 can be formed respectively.

(4) The flange portion 72 is equally and circumferentially divided and includes the large diameter portions 74 and the small diameter portions 75 that are provided circumferentially alternately at the same number. Accordingly, it is possible to realize the cage members 4, 5 in which the large diameter portions 74 and the small diameter portions 75 are regularly disposed; a holding force for holding the two cage members 4, 5 can be circumferentially and evenly dispersed; and the mechanical strength and the like can be easily designed.

(5) Since the slits 73 circumferentially divide the flange portion 72, it is possible to facilitate bending of the large diameter portions 74 and the small diameter portions 75 and prevent deformation of the vertical portion 71 accompanying the bending from affecting the shape in the vicinity.

Second Embodiment

Next, the second embodiment of the present invention will be described with reference to FIGS. 12A to 12B and 13A to 13B. A thrust roller bearing according to the present embodiment is closest to the modification described with reference to FIGS. 9A to 9C among the first embodiment and the modifications thereof. Accordingly, names and reference signs of members and the like used in the modification of FIGS. 9A to 9C are adopted and repetitive descriptions thereof will be omitted.

Figure 12A:
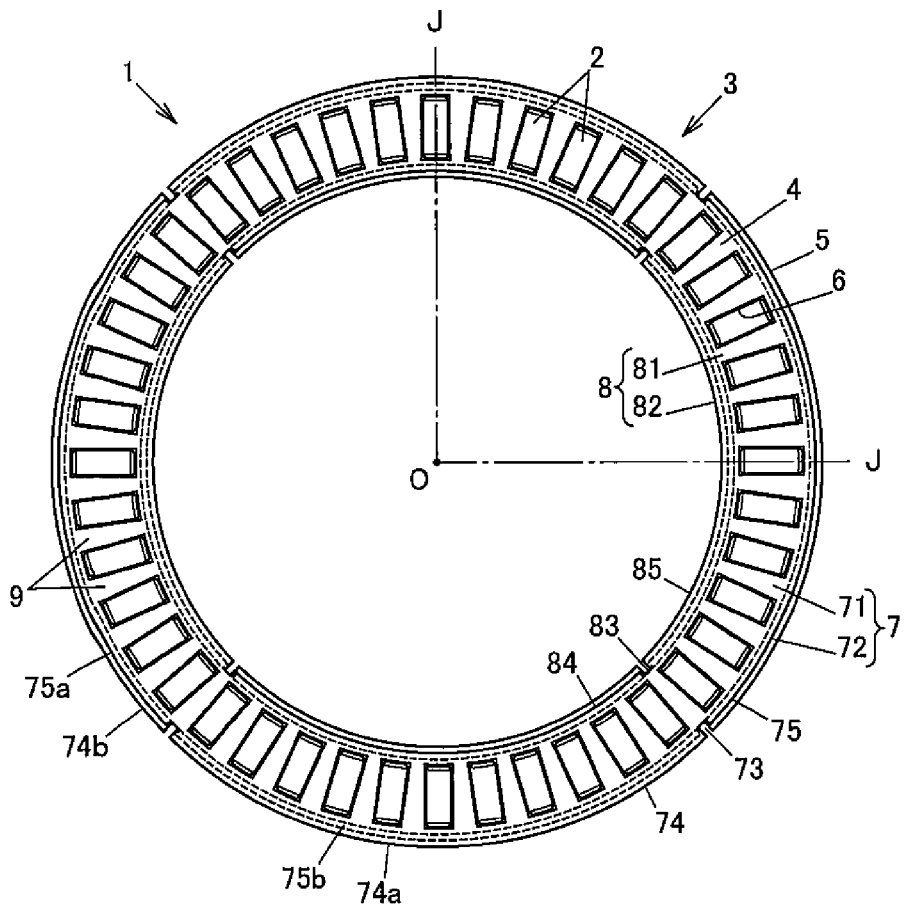
FIG. 12A is a plan view of a thrust roller bearing according to a second embodiment of the present invention.
Figure 12B:
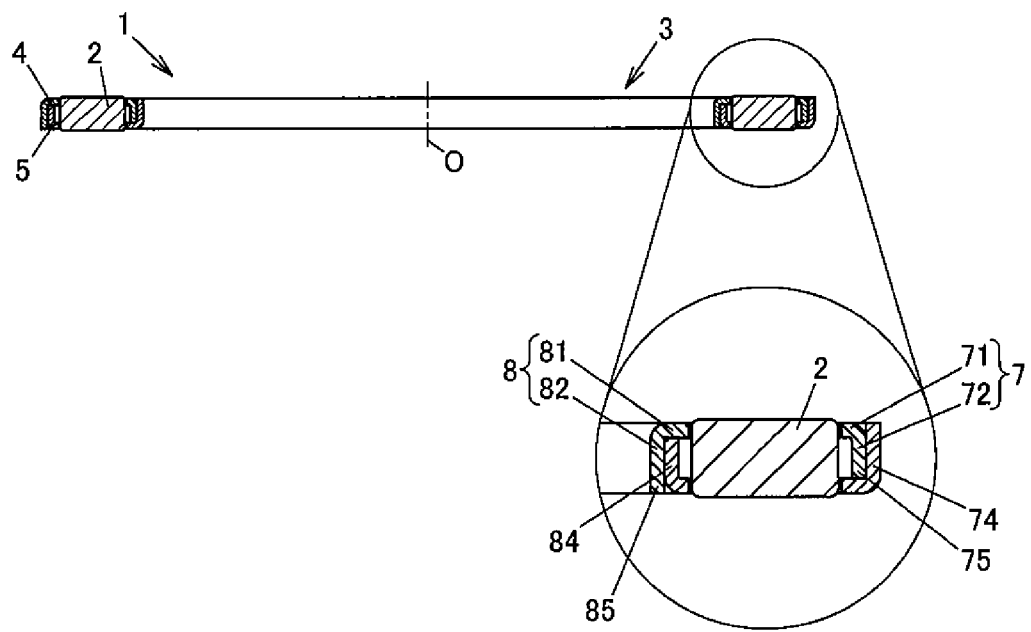
FIG. 12B is a cross-sectional view taken along a line J-J in FIG. 12A.
Figure 13A:
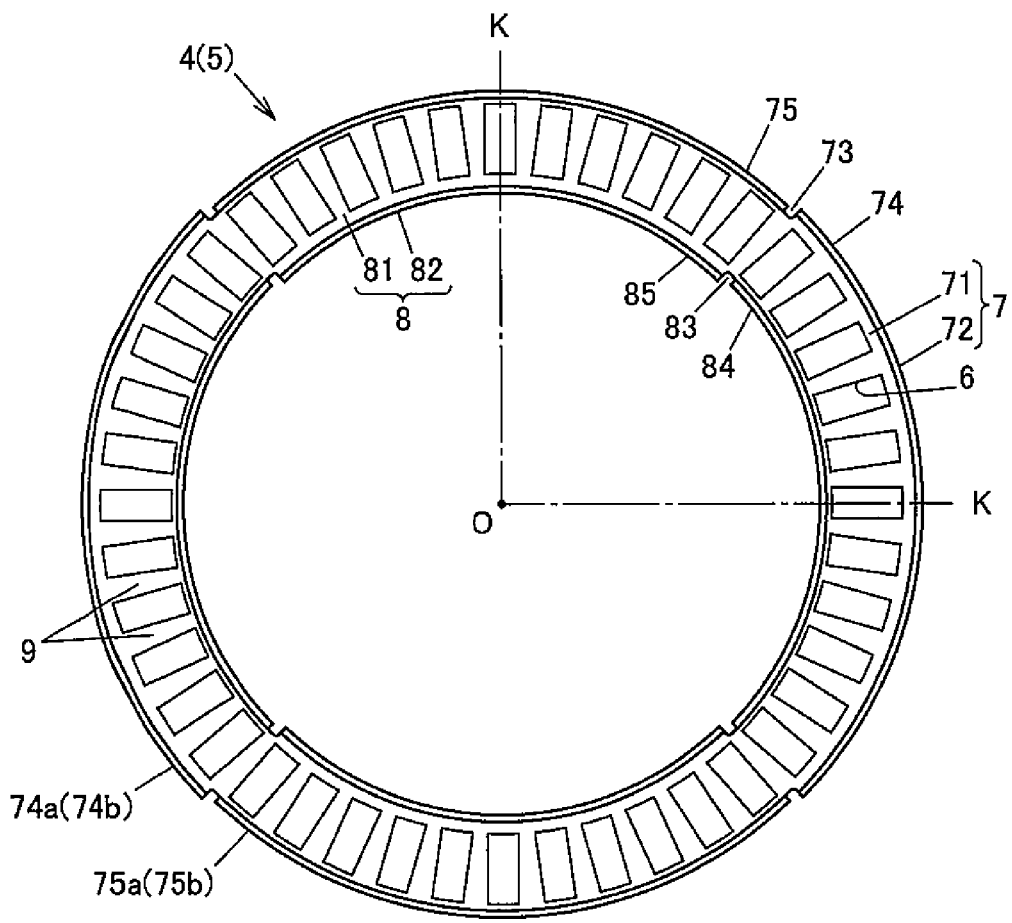
FIG. 13A is a plan view illustrating a first cage member of first and second cage members that constitute a cage of the thrust roller bearing in the second embodiment.
Figure 13B:
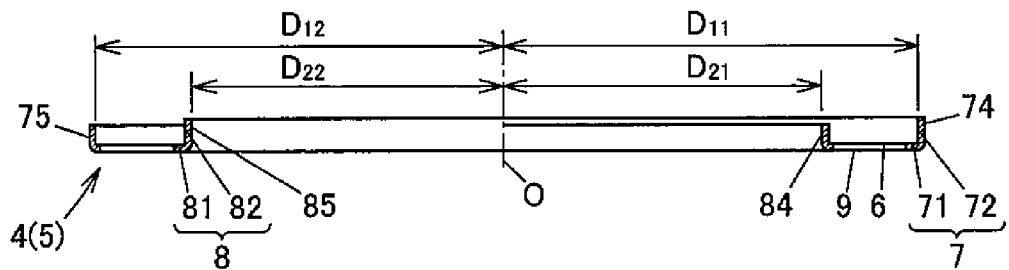
FIG. 13B is a cross-sectional view taken along a line K-K of the first cage member in FIG. 13A.

FIG. 12A is a plan view of the thrust roller bearing according to the present embodiment of the present invention, and FIG. 12B is a cross-sectional view taken along a line J-J in FIG. 12A. FIG. 13A is a plan view illustrating the first cage member 4 of first and second cage members 4, 5 that constitute the cage 3 of the thrust roller bearing 1, and FIG. 13B is a cross-sectional view taken along a line K-K of the first cage member 4 in FIG. 13A. In FIGS. 13A and 13B, reference signs of components of the second cage member 5 corresponding to those of the first cage member 4 are illustrated in parentheses. Similarly to the first embodiment, the first cage member 4 and the second cage member 5 in the present embodiment also have the same shape.

FIGS. 9A to 9C illustrate a case where the total number of the large diameter portions 74 and the small diameter portions 75 of the flange portion 72 of the outer annular portion 7, as well as the total number of the large diameter portions 84 and the small diameter portions 85 of the flange portion 82 of the inner annular portion 8, is the same as the number of the retaining holes 6. In the present embodiment, however, the total number of the large diameter portions 74 and the small diameter portions 75 of the flange portion 72 of the outer annular portion 7, as well as the total number of the large diameter portions 84 and the small diameter portions 85 of the flange portion 82 of the inner annular portion 8, is smaller than the number of the retaining holes 6. Specifically, the number of the large diameter portions 74 and the small diameter portions 75 of the flange portion 72 of the outer annular portion 7 is respectively two (total number=4); the number of the large diameter portions 84 and the small diameter portions 85 of the flange portion 82 of the inner annular portion 8 is respectively two (total number=4); and the number of the retaining holes 6 is 44.

The flange portion 72 of the outer annular portion 7 is divided into two large diameter portions 74 and two small diameter portions 75 by the slits 73. The large diameter portions 74 and the small diameter portions 75 are circumferentially provided in a range of approximately 90 degrees, respectively. Similarly, the flange portion 82 of the inner annular portion 8 is divided into two large diameter portions 84 and two small diameter portions 85 by the slits 83. The large diameter portions 84 and the small diameter portions 85 are circumferentially provided in a range of approximately 90 degrees, respectively. The flange portions 72, 82 are divided by the slits 73 at positions coinciding, with respect to the circumferential direction, with the cage bar portions 9 of the first and second cage members 4, 5.

In the present embodiment, the large diameter portions 84 of the inner annular portion 8 are provided on a radially inner side of the respective large diameter portions 74 of the outer annular portion 7; the small diameter portions 85 of the inner annular portion 8 are provided on a radially inner side of the respective small diameter portions 75 of the outer annular portion 7. Accordingly, the strength of the first and second cage members 4, 5 is maintained by ensuring the radial width thereof. That is, the radial width of the vertical portion 81 of the inner annular portion 8 is narrowed in parts where the large diameter portions 84 of the inner annular portion 8 are provided; however, the radial width of the vertical portion 71 of the outer annular portion 7 is widen, thereby ensuring the strength. Further, the radial width of the vertical portion 71 of the outer annular portion 7 is narrowed in parts where the small diameter portions 75 of the outer annular portion 7 are provided; however, the radial width of the vertical portion 81 of the inner annular portion 8 is widen, thereby ensuring the strength. By ensuring the strength in this manner, for example, when the first cage member 4 and the second cage member 5 are combined, it is possible to prevent deformation of one or both of the cage members 4, 5.

Distances from the central axis O of the two large diameter portions 74 of the outer annular portion 7 are equal to each other; distances from the central axis O of the two small diameter portions 75 of the outer annular portion 7 are also equal to each other. As illustrated in FIG. 13B, when the distances from the central axis O of the two large diameter portions 74 of the outer annular portion 7 are D11 and the distances from the central axis O of the two small diameter portions 75 of the outer annular portion 7 are D12, D12 is smaller than D11 and the outer diameter of the small diameter portions 75 is slightly smaller than the inner diameter of the large diameter portions 74.

Similarly, distances from the central axis O of the two large diameter portions 84 of the inner annular portion 8 are equal to each other; distances from the central axis O of the two small diameter portions 85 of the inner annular portion 8 are also equal to each other. As illustrated in FIG. 13B, when the distances from the central axis O of the two large diameter portions 84 of the inner annular portion 8 are D21 and the distances from the central axis O of the two small diameter portions 85 of the inner annular portion 8 are D22, D22 is smaller than D21 and the outer diameter of the small diameter portions 85 is slightly smaller than the inner diameter of the large diameter portions 84.

The outer annular portion 7 of the first cage member 4 overlap the outer annular portion 7 of the second cage member 5; the large diameter portions 74 of the first cage member 4 overlap the small diameter portions 75 of the second cage member 5; and the small diameter portions 75 of the first cage member 4 overlap the large diameter portions 74 of the second cage member 5. Further, the inner annular portion 8 of the first cage member 4 overlap the inner annular portion 8 of the second cage member 5; the large diameter portions 84 of the first cage member 4 overlap the small diameter portions 85 of the second cage member 5; and the small diameter portions 85 of the first cage member 4 overlap the large diameter portions 84 of the second cage member 5.

The first cage member 4 and the second cage member 5 are fastened to each other by single-sided swaging or double-sided swaging while the large diameter portions 74, 84 and the small diameter portions 75, 85 are radially overlapped in this manner.

(Modifications of Second Embodiment)

Next, first and second modifications of the second embodiment will be described with reference to FIGS. 14A to 14D and 15A to 15D.

Figure 14A:
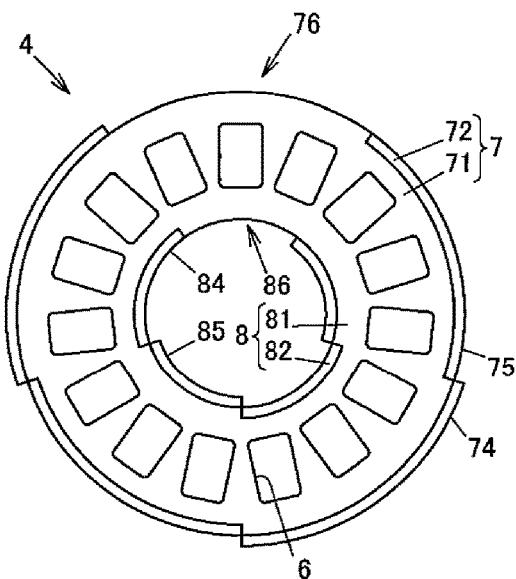
Figure 14B:
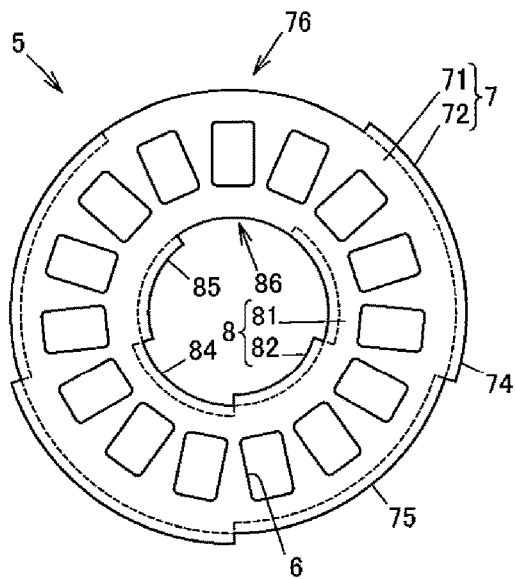
Figure 14C:
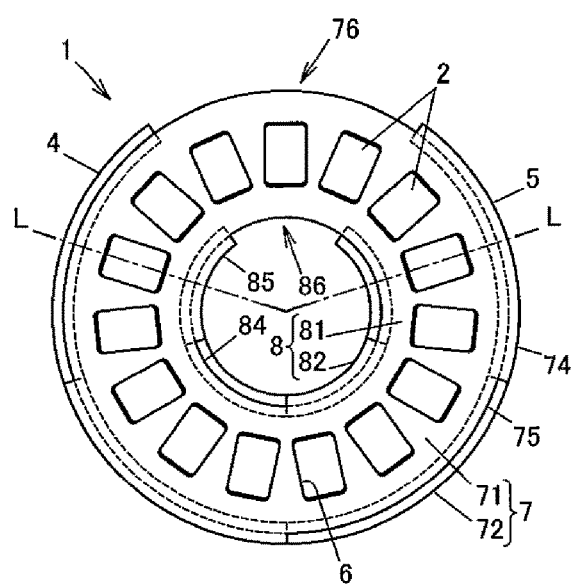
Figure 14D:
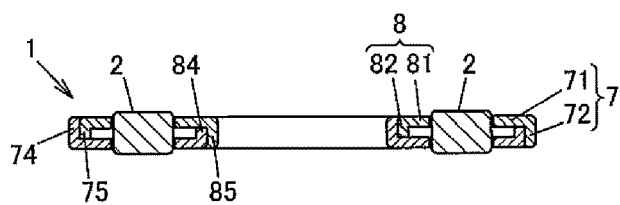

FIGS. 14A to 14D illustrate the first modification of the second embodiment. FIGS. 15A to 15D illustrate the second modification of the second embodiment. FIGS. 14A and 15A illustrate front views of the first cage member 4, and FIGS. 14B and 15B illustrate back views of the second cage member 5. FIGS. 14C and 15C illustrate the thrust roller bearing 1 combining the first and second cage members 4, 5, and FIGS. 14D and 15D respectively illustrate cross-sectional views taken along a line L-L in FIG. 14C and a line M-M in FIG. 15C.

In the example of FIGS. 12A, 12B, 13A, and 13B, the flange portion 72 of the outer annular portion 7 is divided into a plurality of large diameter portions 74 and a plurality of small diameter portions 75 by the slits 73; the flange portion 82 of the inner annular portion 8 is divided into a plurality of large diameter portions 84 and a plurality of small diameter portions 85 by the slits 83. However, in the first modification illustrated in FIGS. 14A to 14D, the flange portion 72 of the outer annular portion 7 is divided into a plurality of large diameter portions 74 and a plurality of small diameter portions 75 without the slits 73; the flange portion 82 of the inner annular portion 8 is divided into a plurality of large diameter portions 84 and a plurality of small diameter portions 85 without the slits 83. In the first modification illustrated in FIGS. 14A to 14D, the lacking portions 76, 86 are formed in the flange portion 72 of the outer annular portion 7 and the flange portion 82 of the inner annular portion 8. The slits 73, 83 may be provided as appropriate.

In the first modification illustrated in FIGS. 14A to 14D, circumferential lengths of the large diameter portions 74 of the flange portions 72 of the first and second cage members 4, 5 are equal to each other; circumferential lengths of the plurality of small diameter portions 75 are also equal to each other. When the first and second cage members 4, 5 are combined, the plurality of large diameter portions 74 of the first cage member 4 and the plurality of large diameter portions 74 of the second cage member 5, and the plurality of small diameter portions 75 of the first cage member 4 and the plurality of small diameter portions 75 of the second cage member 5, are meshed with each other without gaps. Similarly to the embodiment and modifications in FIG. 1A to FIG. 9C, a gap may be provided.

Similarly, circumferential lengths of the large diameter portions 84 of the flange portion 82 of the first and second cage members 4, 5 are equal to each other; circumferential lengths of the plurality of small diameter portions 85 are also equal to each other. When the first and second cage members 4, 5 are combined, the plurality of large diameter portions 84 of the first cage member 4 and the plurality of large diameter portions 84 of the second cage member 5, and the plurality of small diameter portions 85 of the first cage member 4 and the plurality of small diameter portions 85 of the second cage member 5, are meshed with each other without gaps. The lacking portions 76, 86 are formed in areas on a radial outer side and radially inner side of the three retaining holes 6 respectively. Similarly to the embodiment and modifications in FIG. 1A to FIG. 9C, a gap may be provided.

The second modification illustrated in FIGS. 15A to 15D is obtained by further modifying the first modification illustrated in FIGS. 14A to 14D to eliminate the lacking portions 76, 86. In the second modification, circumferential lengths of the large diameter portion 74 and the small diameter portion 75 in the first modification, which sandwich a part where the lacking portion 76 is formed in the flange portion 72 of the outer annular portion 7, are increased to eliminate the lacking portion 76. In the second modification, circumferential lengths of the large diameter portion 84 and the small diameter portion 85 in the first modification, which sandwich a part where the lacking portion 86 is formed in the flange portion 82 of the inner annular portion 8, are increased to eliminate the lacking portion 86. The pair of large diameter portions 74, 84 and the pair of small diameter portions 75, 85 that have large circumferential lengths are divided at positions on a radially outer side and radially inner side of the retaining hole 6. The slits 73, 83 may be provided as appropriate. Similarly to the embodiment and modifications in FIGS. 1A to FIG. 9C, a gap may be provided in the circumferential direction.

(Operation and Effects of Second Embodiment)

According to the second embodiment of the present invention described above, the following operation and effects can be obtained in addition to those of (1) to (5) described in the first embodiment.

(6) Since the total number of the large diameter portions 74 and the small diameter portions 75 of the flange portion 72 of the outer annular portion 7, as well as the total number of the large diameter portions 84 and the small diameter portions 85 of the flange portion 82 of the inner annular portion 8, is smaller than the number of the retaining holes 6, the first cage member 4 and the second cage member 5 are combined easily.

(7) In the first and second cage members 4, 5, the large diameter portions 84 of the inner annular portion 8 are provided on a radially inner of the respective large diameter portions 74 of the outer annular portion 7; the small diameter portions 85 of the inner annular portion 8 are provided on a radially inner side of the respective small diameter portions 75 of the outer annular portion 7. Accordingly, the strength is maintained even if the radial width of the first and second cage members 4, 5 is narrowed.

Although the present invention has been described based on the embodiments, the present invention is not limited thereto and can be appropriately modified and carried out without departing from the concept of the present invention. For example, although the above embodiments described a case where the first and second cage members 4, 5 are both metal, the cage that is not swaged in the case of single-sided swaging may be formed of resin such as PA66 (nylon 66) and PPS (polyphenylene sulfide).

This application is based on Japanese Patent Application No. 2017-031169 filed on Feb. 22, 2017 and Japanese Patent Application No. 2018-016638 filed on Feb. 1, 2018, the contents of which are incorporated herein by reference.

DESCRIPTION OF REFERENCE SIGNS

1 . . . thrust roller bearing, 2 . . . roller, 3 . . . cage (cage for thrust roller bearing), 4 . . . first cage member, 5 second cage member, 6 . . . retaining hole, 7 . . . outer annular portion, 71 vertical portion, 72 . . . flange portion, 73 . . . slit, 74, 74a, 74b . . . large diameter portion, 75, 75a, 75b . . . small diameter portion, 76 . . . lacking portion, 77 . . . non-overlapping portion, 8 . . . inner annular portion, 81 . . . vertical portion, 82 . . . flange portion, 82a . . . segment, 82b . . . gap, 84 . . . large diameter portion, 85 ... small diameter portion, 76 ... lacking portion, 9 ... cage bar portion, O ... central axis

The invention claimed is:

1. A cage for a thrust roller bearing, the cage having an annular shape and retains a plurality of rollers in a rollable manner, the cage comprising:
   a first cage member and a second cage member, each of the first cage member and the second cage member including an outer annular portion formed on a radially outer side of a plurality of retaining holes that retains the plurality of rollers; an inner annular portion formed on a radially inner side of the retaining holes; and a plurality of cage bar portions radially connecting the outer annular portion and the inner annular portion to each other to restrict an axial movement of the rollers,
   wherein the first cage member and the second cage member are configured to have a same shape,
   wherein each of the outer annular portion of the first cage member and the outer annular portion of the second cage member includes a vertical portion having a planar and annular shape and extending perpendicular to an axial direction that is parallel to a central axis; and a flange portion extending axially from a radially outer end of the vertical portion and is circumferentially divided into a plurality of arc-shaped parts,
   wherein the flange portion includes arc-shaped large diameter portions, each having an equal distance from the central axis; and arc-shaped small diameter portions, each having a shorter distance from the central axis than the distance from the central axis to the large diameter portions, and
   wherein the first cage member and the second cage member are fastened to each other in a state in which the large diameter portions of the first cage member and the small diameter portions of the second cage member overlap each other and the small diameter portions of the first cage member and the large diameter portions of the second cage member overlap each other.

2. The cage for a thrust roller bearing according to claim 1,
   wherein the flange portion is divided at positions coinciding with the cage bar portions with respect to a circumferential direction.

3. The cage for a thrust roller bearing according to claim 1,
   wherein the flange portion is divided into two or more parts but a number of the parts is equal to or less than a number of the retaining holes.

4. The cage according to claim 1,
   wherein the flange portion is equally divided circumferentially and includes a plurality of the large diameter portions and a plurality of the small diameter portions, a number of the small diameter portions being the same as the large diameter portions, and
   wherein the large diameter portions and the small diameter portions are provided circumferentially alternately.

5. The cage for a thrust roller bearing according to claim 1,
   wherein slits are provided to circumferentially divide the flange portion.

6. A thrust roller bearing comprising:
   a plurality of rollers; and
   a cage according to claim 1.

7. A cage for a thrust roller bearing, the cage having an annular shape and retains a plurality of rollers in a rollable manner, the cage comprising:
   a first cage member and a second cage member, each of the first cage member and the second cage member including an outer annular portion formed on a radially outer side of a plurality of retaining holes that retains the plurality of rollers; an inner annular portion formed on a radially inner side of the retaining holes; and a plurality of cage bar portions radially connecting the outer annular portion and the inner annular portion to each other to restrict an axial movement of the rollers,
   wherein the first cage member and the second cage member are configured to have a same shape,
   wherein each of the inner annular portion of the first cage member and the inner annular portion of the second cage member includes a vertical portion having a planar and annular shape and extending perpendicular to an axial direction that is parallel to a central axis; and a flange portion extending axially from a radially inner end of the vertical portion and is circumferentially divided into a plurality of arc-shaped parts,
   wherein the flange portion includes arc-shaped large diameter portions, each having an equal distance from the central axis; and arc-shaped small diameter portions, each having a shorter distance from the central axis than the distance from the central axis to the large diameter portions, and
   wherein the first cage member and the second cage member are fastened to each other in a state in which the large diameter portions of the first cage member and the small diameter portions of the second cage member overlap each other and the small diameter portions of the first cage member and the large diameter portions of the second cage member overlap each other.

8. The cage for a thrust roller bearing according to claim 7,
   wherein the flange portion is divided at positions coinciding with the cage bar portions with respect to a circumferential direction.

9. The cage for a thrust roller bearing according to claim 7,
   wherein the flange portion is divided into two or more parts but a number of the parts is equal to or less than a number of the retaining holes.

10. The cage according to claim 7,
    wherein the flange portion is equally divided circumferentially and includes a plurality of the large diameter portions and a plurality of the small diameter portions, a number of the small diameter portions being the same as the large diameter portions, and
    wherein the large diameter portions and the small diameter portions are provided circumferentially alternately.

11. The cage for a thrust roller bearing according to claim 7,
    wherein slits are provided to circumferentially divide the flange portion.

12. A thrust roller bearing comprising:
    a plurality of rollers; and
    a cage according to claim 7.

13. A cage for a thrust roller bearing, the cage having an annular shape and retains a plurality of rollers in a rollable manner, the cage comprising:
    a first cage member and a second cage member, each of the first cage member and the second cage member including an outer annular portion formed on a radially outer side of a plurality of retaining holes that retains the plurality of rollers; an inner annular portion formed on a radially inner side of the retaining holes; and a plurality of cage bar portions radially connecting the outer annular portion and the inner annular portion to each other to restrict an axial movement of the rollers, wherein the first cage member and the second cage member are configured to have a same shape, wherein each of the outer annular portion of the first cage member and the outer annular portion of the second cage member includes a vertical portion having a planar and annular shape and extending perpendicular to an axial direction that is parallel to a central axis; and a flange portion extending axially from a radially outer end of the vertical portion and is circumferentially divided into a plurality of arc-shaped parts, wherein each of the inner annular portion of the first cage member and the inner annular portion of the second cage member includes a vertical portion having a planar and annular shape and extending perpendicular to the axial direction that parallel to the central axis; and a flange portion extending axially from a radially inner end of the vertical portion and circumferentially divided into a plurality of arc-shaped parts, wherein each of the flange portions includes arc-shaped large diameter portions, each of the arc-shaped large diameter portions of each respective one of the flange portions having an equal distance from the central axis; and each of the flange portions includes arc-shaped small diameter portions, each of the arc-shaped small diameter portions of each respective one of the flange portions having a shorter distance from the central axis than the distance from the central axis to the large diameter portions of each respective one of the flange portions, and wherein the first cage member and the second cage member are fastened to each other in a state in which the large diameter portions of the first cage member and the small diameter portions of the second cage member overlap each other and the small diameter portions of the first cage member and the large diameter portions of the second cage member overlap each other.

14. The cage for a thrust roller bearing according to claim 13, wherein the large diameter portions of the flange portion of the inner annular portion is provided on a radially inner side of the respective large diameter portions of the flange portion of the outer annular portion, and wherein the small diameter portions of the flange portion of the inner annular portion is provided on a radially inner side of the respective small diameter portions of the flange portion of the outer annular portion.

15. The cage for a thrust roller bearing according to claim 13, wherein each of the flange portions is divided at positions coinciding with the cage bar portions with respect to a circumferential direction.

16. The cage for a thrust roller bearing according to claim 13, wherein each of the flange portions is divided into two or more parts but a number of the parts is equal to or less than a number of the retaining holes.

17. The cage according to claim 13, wherein each of the flange portions is equally divided circumferentially and includes a plurality of the large diameter portions and a plurality of the small diameter portions, a number of the small diameter portions being the same as the large diameter portions, and wherein the large diameter portions and the small diameter portions are provided circumferentially alternately.

18. The cage for a thrust roller bearing according to claim 13, wherein slits are provided to circumferentially divide the flange portion.

19. A thrust roller bearing comprising:

a plurality of rollers; and a cage according to claim 13.

* * * * *